United States Patent
Cardarelli et al.

(10) Patent No.: US 8,784,639 B2
(45) Date of Patent: Jul. 22, 2014

(54) ELECTROCHEMICAL PROCESS FOR THE RECOVERY OF METALLIC IRON AND CHLORINE VALUES FROM IRON-RICH METAL CHLORIDE WASTES

(75) Inventors: François Cardarelli, Montreal (CA);
Sylvain Lefebvre, Sorel-Tracy (CA);
Claude Tousignant, Sorel-Tracy (CA);
Guillaume Hudon, Sorel-Tracy (CA)

(73) Assignee: Rio Tinto fer et Titane Inc., Quebec (CA)

( * ) Notice: Subject to any disclaimer, the term of this patent is extended or adjusted under 35 U.S.C. 154(b) by 577 days.

(21) Appl. No.: 12/933,653

(22) PCT Filed: Mar. 20, 2008

(86) PCT No.: PCT/CA2008/000544
§ 371 (c)(1),
(2), (4) Date: Dec. 14, 2010

(87) PCT Pub. No.: WO2009/114925
PCT Pub. Date: Sep. 24, 2009

(65) Prior Publication Data
US 2011/0114500 A1 May 19, 2011

(51) Int. Cl.
*C25C 1/06* (2006.01)
(52) U.S. Cl.
CPC .................................. *C25C 1/06* (2013.01)
USPC .......................................... 205/587; 205/593
(58) Field of Classification Search
USPC .......................................... 205/593
See application file for complete search history.

(56) References Cited

U.S. PATENT DOCUMENTS

| | | | |
|---|---|---|---|
| 1,752,348 A | 4/1930 | Levy | |
| 1,980,381 A | 11/1934 | Cain | |
| 2,272,899 A | 2/1942 | Street | |
| 2,393,582 A | 1/1946 | Agnew | |
| 2,441,856 A * | 5/1948 | Turner et al. ................ | 423/78 |

(Continued)

FOREIGN PATENT DOCUMENTS

| | | |
|---|---|---|
| CA | 1044641 | 12/1978 |
| CA | 202296 | 7/1990 |

(Continued)

OTHER PUBLICATIONS

Full English translation of JP 02-015187 A.*

(Continued)

*Primary Examiner* — Harry D Wilkins, III
(74) *Attorney, Agent, or Firm* — Wells St. John P.S.

(57) ABSTRACT

An electrochemical process for the concurrent recovery of iron metal and chlorine gas from an iron-rich metal chloride solution, comprising electrolysing the iron-rich metal chloride solution in an electrolyser comprising a cathodic compartment equipped with a cathode having a hydrogen overpotential higher than that of iron and containing a catholyte having a pH below about 2, an anodic compartment equipped with an anode and containing an anolyte, and a separator allowing for anion passage, the electrolysing step comprising circulating the iron-rich metal chloride solution in a non-anodic compartment of the electrolyser, thereby causing iron to be electrodeposited at the cathode and chlorine gas to evolve at the anode, and leaving an iron-depleted solution, which is recirculated, at least in part, to the iron-rich metal chloride solution. The iron-rich metal chloride solution may originate from carbo-chlorination wastes, spent acid leaching liquors or pickling liquors.

38 Claims, 13 Drawing Sheets

(56) References Cited

U.S. PATENT DOCUMENTS

| | | |
|---|---|---|
| 2,954,274 A | 9/1960 | Walsh |
| 3,016,286 A | 1/1962 | Masukawa et al. |
| 3,041,253 A | 6/1962 | Audubert et al. |
| 3,216,787 A | 11/1965 | Koenen et al. |
| 3,615,957 A | 10/1971 | Konstantouros |
| 3,617,461 A | 11/1971 | Currey et al. |
| 3,632,498 A | 1/1972 | Beer |
| 3,793,444 A | 2/1974 | Reeves et al. |
| 3,859,194 A | 1/1975 | Barrett |
| 3,865,920 A | 2/1975 | Dunn, Jr. |
| 4,043,822 A | 8/1977 | Karsay et al. |
| 4,060,584 A | 11/1977 | Hartmann et al. |
| 4,144,316 A | 3/1979 | Haack et al. |
| 4,282,185 A | 8/1981 | Reeves et al. |
| 4,300,992 A * | 11/1981 | Yoshida et al. ............... 204/242 |
| 4,318,794 A | 3/1982 | Adler |
| 4,515,673 A * | 5/1985 | Hayfield .................. 204/196.36 |
| 4,593,116 A | 6/1986 | Stammann et al. |
| 4,909,913 A | 3/1990 | Fukuda et al. |
| 4,994,255 A | 2/1991 | Hsu |
| 4,997,533 A * | 3/1991 | Kawatra et al. ............... 205/592 |
| 5,051,165 A | 9/1991 | Andrews |
| 5,298,280 A | 3/1994 | Kaczur et al. |
| 5,639,360 A | 6/1997 | Prum et al. |
| 5,911,869 A | 6/1999 | Greaney |
| 5,954,854 A | 9/1999 | Inoshita et al. |
| 5,994,252 A | 11/1999 | Feige et al. |
| 6,375,824 B1 | 4/2002 | Phinney |
| 6,511,646 B1 | 1/2003 | Hooper et al. |
| 6,827,860 B2 | 12/2004 | Schinkitz |
| 2002/0159927 A1 | 10/2002 | Allen et al. |
| 2004/0074780 A1 | 4/2004 | Twardowski et al. |
| 2004/0126984 A1 | 7/2004 | Son et al. |
| 2004/0182717 A1 | 9/2004 | Kinard et al. |
| 2004/0228783 A1 | 11/2004 | Harris et al. |
| 2005/0014066 A1 | 1/2005 | Shimamune |
| 2010/0044243 A1 * | 2/2010 | Cardarelli ..................... 205/564 |
| 2011/0114500 A1 | 5/2011 | Cardarelli et al. |

FOREIGN PATENT DOCUMENTS

| | | |
|---|---|---|
| GB | 1 407 034 | 7/1972 |
| JP | S48-30226 | 3/1969 |
| JP | S46-1563 | 1/1971 |
| JP | S46-9534 | 3/1971 |
| JP | 62-158833 | 7/1987 |
| JP | 02 026802 | 7/1988 |
| JP | 02-015187 A * | 1/1990 |
| JP | 2015187 A | 1/1990 |
| JP | 07-070769 | 3/1995 |
| JP | 07-080466 | 3/1995 |
| JP | 09-263983 | 10/1997 |
| JP | 9-263985 | 10/1997 |
| JP | 2004-43946 | 1/2004 |
| JP | 2006 241568 | 9/2006 |
| JP | 2010-504423 | 2/2010 |
| JP | 2009-528559 | 3/2012 |
| WO | WO 95/23880 | 9/1995 |
| WO | WO 03/097903 | 11/2003 |
| WO | WO 2008/034212 | 3/2008 |
| WO | WO 2008/034212 A1 | 3/2008 |

OTHER PUBLICATIONS

Full English translation of JP 02-026802 A.*
Cardarelli, F. Materials Handbook: a Concise Desktop Reference. Springer-Verlag London Limited [Ed.]. 2000. p. 323.
Harris, et al.—Process for chlorination of titanium bearing materials and for dechlorination of iron chloride.—in Weiss, A. (ed)(1976)—World Mining and Metals Technology.—The Society of Mining Engineers, New York, Chap. 44, pp. 693-712.

* cited by examiner

ELECTROCHEMICAL PROCESS FOR THE RECOVERY OF METALLIC IRON AND CHLORINE VALUES FROM IRON-RICH METAL CHLORIDE WASTES

RELATED PATENT DATA

This application is a 35 U.S.C. §371 of and claims priority to International Application No. PCT/CA2008/000544 filed on 20 Mar. 2008 and published in English as International Publication No. WO 2009/114925, the entirety of which is incorporated herein by reference.

FIELD OF THE INVENTION

The present invention relates to an electrochemical process for the recovery of metallic iron and chlorine values from iron-rich metal chloride wastes. More specifically, the present invention is concerned with an electrochemical process for the recovery of metallic iron and chlorine values from iron-rich metal chloride wastes such as carbo-chlorination wastes, spent acid leaching liquors, pickling liquors, or any other iron-rich metal chloride liquor or solution.

BACKGROUND OF THE INVENTION

In the chemical industries, chlorine gas ($Cl_2$) is one of the most widely used inorganic chemicals. For example, polyurethanes, halogenated hydrocarbons and white titanium dioxide pigment are commonly manufactured in processes using chlorine gas.

In the latter case of white titanium dioxide pigment manufacture, feedstock is chlorinated with chlorine gas. Chlorinated species are reduced to waste by-products such as: hydrogen chloride ($HCl_{gas}$), hydrochloric acid ($HCl_{aq}$) or inorganic metal chlorides (e.g., $FeCl_3$, $FeCl_2$, $MgCl_2$).

In particular, when titanium tetrachloride ($TiCl_4$) is prepared by the carbo-chlorination of titaniferous ores feedstock (e.g., weathered ilmenite, titanium slag or synthetic rutiles), significant amounts of iron and metal chlorides species are generated as by-products. These by-products may comprise either ferrous or ferric chlorides or a combination thereof, depending on the reaction conditions of the chlorinator. The actual by-products are in fact more complex as these consist of a chlorination waste which is essentially made of a blend of particulate iron chlorides contaminated with unreacted titanium feedstocks, petroleum coke, silica and silicates, and other metal chlorides. The approximate chemical composition of the metal chlorides collected from the cyclones of chlorinators operating with titanium slag only is presented in Table 1 below.

TABLE 1

Average composition ranges of the metal chlorides in an as-received chlorinator dust, expressed as anhydrous salts (wt. %)

| Metal chlorides | Formula | Percentage |
|---|---|---|
| Iron (II) chloride | $FeCl_2$ | 30-90 |
| Aluminum (III) chloride | $AlCl_3$ | 5-15 |
| Magnesium (II) chloride | $MgCl_2$ | 2-20 |
| Manganese (II) chloride | $MnCl_2$ | 1-15 |
| Sodium chloride | $NaCl$ | 1-8 |
| Vanadium (IV) oxychloride | $VOCl_2$ | 1-6 |
| Chromium (III) chloride | $CrCl_3$ | 0.5-6 |
| Titanium (III) chloride | $TiCl_3$ | 0.1-3 |

The formation of these chlorinator wastes has severe economic and environmental implications on the overall process because the wastes must be processed for disposal. Usually, by-product iron chlorides are dumped in large scale deep wells or at sea landfills or simply discharged into wastewater stream. Such discarding involves both environmental issues and a complete loss of the economic value of the chlorine species. Despite being environmentally unsound, these practices are still extensively used at many plant locations, worldwide.

Although attempts have been made to commercialize these by-metallic chloride products as flocculating agent in the treatment of wastewater or as etching agent in pickling baths, these attempts are hampered by the low market value of these by-products. In addition, since the by-products are usually in the form of aqueous solutions, transportation charges are prohibitive.

For these reasons, there has been extensive research on chlorine recycling and various attempts have been made over the past forty years in the titanium dioxide pigment industry to recover the chlorine values from iron chlorides.

In addition, since the introduction in 1998 of the upgrading of titanium slag by high pressure hydrochloric acid leaching, an increasing interest has arose in recovering chlorinated metal values from the spent acid. At present the spent acid is pyro-hydrolysed to regenerate an azeotropic solution of hydrochloric acid leaving behind inert metals oxides that are landfilled as mining residues. The average composition ranges of a spent acid is presented in Table 2 below.

TABLE 2

Average composition ranges of spent acid

| Cations or chemicals | Concentration ($c/g \cdot dm^{-3}$) |
|---|---|
| HCl (free) | 40-70 |
| Fe(total) | 30-60 |
| Fe(II) | 20-45 |
| Mg(II) | 10-30 |
| Al(III) | 4-12 |
| Fe(III) | 4-12 |
| Ca(II) | 0.5-2 |
| V(III) | 0.5-2 |
| Mn(II) | 0.5-3 |
| Cr(III) | 0.3-2 |
| Ti(IV) | 0.1-1 |

Until today, there is an absence of a satisfactory industrial process for recovering elemental chlorine from iron chlorides. The main prior art route for recovering chlorine from spent chlorides is the thermo chemical oxidation of iron chlorides in an excess of oxygen.

Thus, several attempts have centered around the oxidation of iron chlorides during which the following chemical reactions are involved:

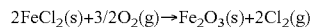

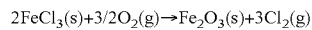

However, until today it has proved very difficult to develop a satisfactory industrial process incorporating the reaction exemplified in the previous equations. Many efforts have been made to overcome the attendant difficulties by conducting the reaction in the gaseous phase such as indicated by Harris et al.[1]. Harris suggested that ferric chloride can be treated with oxygen in a fluidized-bed reactor in the vapor phase. The process produces chlorine gas, which can be recycled to an ilmenite or rutile chlorination process, and iron oxide by-product rather than soluble chloride wastes.

GB Patent 1,407,034[2] discloses oxidation of gaseous ferrous chloride with oxygen in excess at temperatures sufficiently high to avoid condensation of the ferrous chloride.

U.S. Pat. No. 3,865,920[3] to RZM Ltd., discloses a process consisting in preheating ferrous chloride at 980° C. to 1110° C. and then oxidizing it by passing pure oxygen to form a mixture of iron chlorides, iron oxide, oxygen and chlorine, which mixture is thereafter cooled and the residual iron chloride converted to iron oxide and chlorine.

The main issues with the full oxidation of either $FeCl_2$ or $FeCl_3$ to iron oxides and chlorine is that thermodynamics requires low temperatures, i.e., usually below 400° C., to shift the equilibrium in favor of the oxidation of the ferric chloride. However it appears that, at low temperatures imposed by thermodynamics, the reaction kinetics becomes too slow whereas at higher temperatures, where the reaction proceeds at a practical rate, the reaction is far from complete.

It was subsequently found that the utilization of a catalyst such as iron oxide accelerates the reaction at lower temperatures. Thus the use of an iron oxide fluidized bed reactor was proposed to lower the reaction temperatures. Actually, U.S. Pat. No. 2,954,274[4] to Columbia Southern Chemical Corp. proposed to oxidize ferrous iron chloride by means of air or oxygen at temperatures from 400° C. to 1000° C. in a fluidized bed of iron chloride and optionally iron oxide. Later, in U.S. Pat. No. 3,793,444[5] to E.I DuPont de Nemours the oxidation of gaseous iron chloride was performed by passing a mixture of the iron chloride and oxygen through several superposed zones subdivided by walls and in the presence of recycled inert solid particles (e.g., silica sand). During this process, ferrous chloride ($FeCl_2$) is continuously oxidized, first to ferric chloride ($FeCl_3$) and then to ferric oxide ($Fe_2O_3$) in one stage. Afterwards, in U.S. Pat. No. 4,144,316[6] to E.I DuPont de Nemours, Reeves and Hack improved the process by carrying out the dechlorination reaction in a recirculating-fluidized-bed reactor for example of the type suggested in U.S. Pat. No. 4,282,185[7].

However, an additional problem arises during thermal oxidation, that is, the deposition of a solid, dense and hard iron oxide scale ($Fe_2O_3$). This scale has a severe tendency to accumulate and adhere strongly on the reactor walls and associated equipment, causing problems in the efficient operation and maintenance of the reactor. Actually, it has been demonstrated that oxide scale occurs above bed level to such an extent that the outlet may become completely clogged in a short time and the operation must be frequently stopped for removing the scale leading to expensive shutdowns. Moreover, serious problems were encountered in increasing the size of the fluid bed reactor towards an industrial scale for this reaction.

Other proposals consisted in operating the oxidation process at lower temperatures using a molten salt bath of NaCl to form a salt complex or eutectic with the iron (NaCl—$FeCl_3$) compound; or conducting the oxidation under a pressure sufficient to effect the liquefaction of the ferric chloride. However, these methods generally require the use of complicated apparatus and the exercise of very careful controls over operating conditions. Furthermore, difficulties seem to be encountered in the removal of by-product iron oxide from the reactor and in the sticking of the particulate bed material.

Another drawback of the thermal oxidation process in general seems to be the poor quality of the gaseous chlorine produced, namely about 75 vol % $Cl_2$ because it is largely contaminated with ferric chloride and other volatile impurities and also strongly diluted with unreacted oxygen (11 vol. % $O_2$) and carbon dioxide (7.5 vol. % $CO_2$). Hence it exhibits a relatively poor commercial value. In addition, immediate recycling to the chlorinator as well as efforts to concentrate the dilute chlorine, involve great additional expenses.

Moreover, efficient chlorine recovery by thermal oxidation requires essentially pure ferrous chloride as feedstock. However, the mechanical separation of the particulate ferrous chloride from the major contaminants (i.e., coke) in chlorinator dust is a hard task. In fact, if thermal oxidation of impure ferrous chloride is carried out at temperatures in excess of 800° C., the coke present in the dust is burned up, thereby producing hot spots in the reactor, which leads to the sintering of the iron oxide accompanied by a build-up of the oxide on the walls, which in turn leads to clogging within a short time.

After the unsuccessful pilot and pre-commercial trials made by E.I. Du Pont de Nemours for thermal oxidation, other titanium dioxide pigment producers investigated this technology such as SCM Chemicals Ltd.[8], Kronos Titan GmbH[9] and recently Tioxide[10].

Another route, namely the electrolytic route, was considered for recovery of both chlorine and iron values.

It appears from the prior art that work has been done on the electrodeposition of iron metal from iron-containing solutions since the second half of the eighteenth century. In fact, various processes for electrowinning, electroplating, or electrorefining iron metal are known. Usually, the aim of these processes is to prepare an electrolytic iron with a high purity and to a lesser extent pure iron powders. Usually, the most common electrolytes were based on iron sulphate and to a lesser extent with iron chlorides.

Most of the known electrochemical processes were originally designed to electrodeposit iron at the cathode while the anodic reaction usually consisted in the anodic dissolution of a soluble anode made of impure iron. In such processes, the use of consumable-type anodes seems to have generally allowed avoiding an undesirable evolution of corrosive nascent oxygen or hazardous chlorine gas.

On the anode side, chlorine recovery by electrolysis from brines or by-produced hydrochloric acid is well-documented technology with many plants operating worldwide with a discrete number of electrolytic processes. However an industrial scale electrochemical process that combines the two principles of recovering directly both iron and chlorine from waste iron-containing chlorides does not seem to exist.

The first well-documented attempt apparently dates back to 1928 with the patents of LEVY[11]. The inventor disclosed a simple electrochemical process for recovering both nascent chlorine and pure electrolytic iron from a solution of pure ferrous chloride. The electrolyser was divided with a diaphragm as separator made of porous unglazed clay to prevent the mixing of products. The electrolysis was conducted at 90-100° C. under a current density of 110-270 $A \cdot m^{-2}$ with an average cell voltage of 2.3-3.0 V. The Faradaic current efficiency was 90-100%. The anolyte was a concentrated chloride solution (e.g., $CaCl_2$, NaCl) while the catholyte was an aqueous solution containing 20 wt. % $FeCl_2$. The anode was carbon-based while the cathode was a thin plate, mandrel or other suitable object.

More recently, in 1990, OGASAWARA et al. from Osaka Titanium Co. Ltd (now Toho)[12] disclosed in a patent application an electrolytic process to produce iron and chlorine through the electrolysis of an iron chloride-containing aqueous solution (an effluent resulting from the pickling of steel or from the process of producing titanium tetrachloride or nonferrous titanium ore) by the use of anion and cation exchange membranes in conjunction with a three-compartment electrolyser. In this process as exemplified in Ogasawara, the catholyte, which is made of high purity ferrous chloride and constantly adjusted to a pH of 3 to 5 with ammonia, and the anolyte made of sodium chloride, recirculate in loop inside their respective compartments, while the iron-rich chloride-containing solution to be electrolysed circulates through the central compartment, that is, the gap existing between the two ion-exchange membranes. The cathode used is preferably iron but may also be stainless steel, titanium or titanium alloy, and the anode used is made of insoluble graphite. According to the inventors, this 3-compartment process apparently allows, in contrast to that using a two-compartment electrolytic process, to avoid polluting the resulting electro-crystallized iron by embedded impurities such as metal oxides. In addition, maintaining the catholyte pH between 3 and 5 allows avoiding hydrogen evolution at the cathode.

However, in such process, there appears a high ohmic drop due to (i) the additive resistivities of the ion exchange membranes and (ii) the associated gap existing between the two separators. In addition, the utilization of a graphite anode combined with a sodium chloride brine anolyte seems to cause a high overpotential for the reaction of chlorine evolution. Both the high ohmic drop and the anodic overvoltage contribute to the cell potential. This therefore leads to a high specific energy consumption for both chlorine and iron recovery, which is not compatible with a viable commercial process.

Therefore remains a need for an efficient and economical process to recover both iron metal and chlorine gas from iron-rich metal chloride wastes.

The present description refers to a number of documents, the content of which is herein incorporated by reference in their entirety to the extent that the incorporated subject-matter is not contradictory with the explicit disclosure herein.

SUMMARY OF THE INVENTION

The present invention generally relates to an electrochemical process for the recovery of metallic iron and chlorine gas from iron-rich metal chloride wastes.

More specifically, an aspect of the present invention relates to an electrochemical process for the recovery of metallic iron and chlorine gas from an iron-rich metal chloride solution comprising the following steps:
   a) providing an iron-rich metal chloride solution;
   b) electrolysing the iron-rich metal chloride solution in an electrolyser comprising a cathodic compartment equipped with a cathode having a hydrogen overpotential higher than that of iron and containing a catholyte having a pH below about 2, an anodic compartment equipped with an anode and containing an anolyte, and a separator allowing for anion passage, the electrolysing step comprising circulating the iron-rich metal chloride solution in a non-anodic compartment of the electrolyser, thereby causing iron to be electrodeposited at the cathode and chlorine gas to evolve at the anode, and leaving an iron-depleted solution;
   c) separately recovering the electrodeposited iron and the chlorine gas; and
   d) recirculating at least part of the iron-depleted solution into the iron-rich metal chloride solution in a).

In a specific embodiment of the above-defined process, when the catholyte contains mostly $AlCl_3$ as a non-iron metal chloride, the pH of the catholyte is periodically adjusted to a predetermined pH that ranges between about −1 and about 2, preferably between about −1 and about −0.1, more preferably between about −0.6 and about −0.3.

In another specific embodiment of the above-defined process, when the catholyte contains mostly $MgCl_2$ as a non-iron metal chloride, the pH of the catholyte is periodically adjusted to a predetermined pH that ranges between about 0.3 and about 1.8, preferably between about 0.6 and about 1.5, more preferably between about 0.6 and about 1.1, most preferably between about 0.9 and about 1.1.

In still other specific embodiments of the above-defined process, recirculating d) is made at a recirculation rate over about 60%, preferably over about 80%, more preferably over about 95%.

In still another specific embodiment, the providing of an iron-rich metal chloride solution a) includes:
   a1) leaching a solid carbo-chlorination waste with a hot aqueous solution, thereby forming an aqueous slurry; and
   a2) subjecting the aqueous slurry to a separation of solids, thereby forming an insoluble cake and isolating an iron-rich metal chloride solution.

In another specific embodiment, the cathode has an overvoltage, at 200 $A \cdot m^2$, greater than about 425 mV in 0.5 $mol \cdot dm^{-3}$ HCl at 25° C.

In another specific embodiment, the cathode is constructed from or coated with a material being one of titanium, titanium alloy, zirconium, zirconium alloy, zinc, zinc alloy, cadmium, cadmium alloy, tin, tin alloy, copper, copper alloy, lead, lead alloy, niobium, niobium alloy, gold, gold alloy, mercury or metallic amalgam with mercury.

Another aspect of the present invention relates to a process for the recovery of metallic iron and chlorine gas from an iron-rich metal chloride solution, which process comprises:
   a) providing an iron-rich metal chloride solution;
   b) electrolysing the iron-rich metal chloride solution in a two-compartment electrolyser comprising a cathodic compartment equipped with a cathode having a hydrogen overpotential higher than that of iron, and an anodic compartment equipped with an anode and containing an anolyte, the cathodic and anodic compartments being separated by an anion-exchange membrane, the electrolysing step comprising circulating the iron-rich metal chloride solution, adjusted to a pH below about 2, as a catholyte in the cathodic compartment of the electrolyser, thereby causing iron to be electrodeposited at the cathode and chlorine gas to evolve at the anode, and leaving an iron-depleted solution;
   c) separately recovering the electrodeposited iron and the chlorine gas; and
   d) recirculating at least part of the iron-depleted solution into the iron-rich metal chloride solution in a).

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7 is a photograph obtained by a scanning electron microscope (SEM) showing an overview of a co-deposition of iron and vanadium, as obtained in Example 2a;

FIG. 8 is a photograph obtained by a scanning electron microscope (SEM) showing a detail view of a co-deposition of iron and vanadium pentoxide, as obtained in Example 2a;

FIG. 12 is a graphical illustration showing the current efficiency as a function of ferrous chloride concentration, as obtained in Example 7.

DESCRIPTION OF ILLUSTRATIVE EMBODIMENTS

Figure 1:
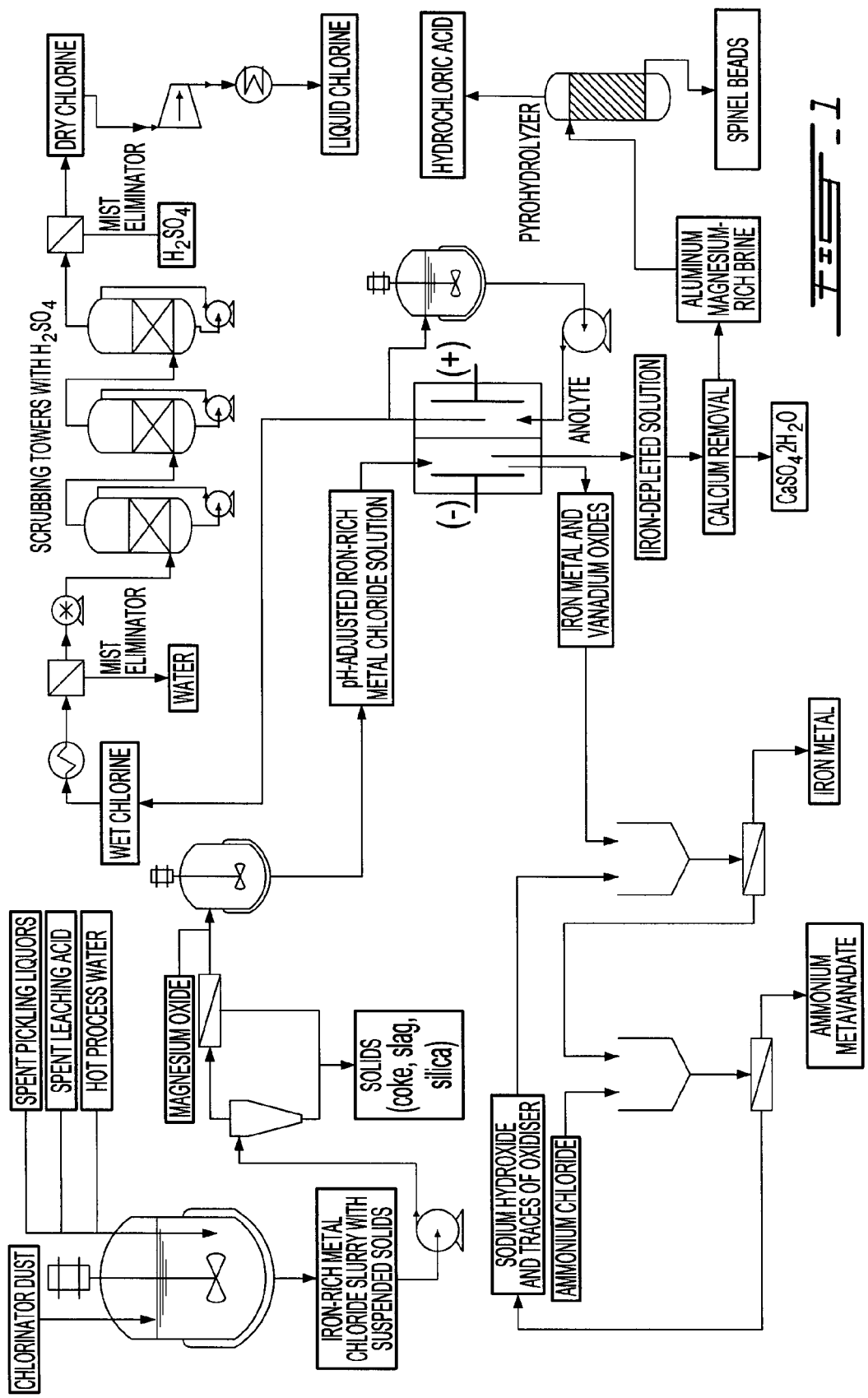
FIG. 1 is a flow-sheet diagram illustrating the various steps of the entire electrochemical process according to a first embodiment of the present invention, based on a two-compartment electrolyser and performing electrolysis with a pH-adjusted iron-rich metal chloride solution.

Various feedstocks may be used in a process according to the present invention, including, but not limited to, carbo-chlorination wastes, for example from carbo-chlorination of titaniferous ores, spent acid leaching liquors, pickling liquors or any other iron-rich metal chloride liquor or solution (containing ferric and/or ferrous chloride). Thus the feedstock may be solid, anhydrous, in slurry form or in solution.

As used herein, the term "electrolyser" generally designates a two-compartment or three-compartment electrolyser. All electrolysers used in the process of the present invention at least comprise an anodic compartment and a cathodic compartment, separated by at least one ion exchange membrane.

As used herein when referring to an electrolyser, the term "non-anodic compartment" designates the cathodic compartment of a two-compartment electrolyser and/or the central compartment of a three-compartment electrolyser. For more clarity, it does not designate the cathodic compartment of a three-compartment electrolyser.

As used herein, the term overpotential (also known as overvoltage) generally designates the difference between the electrical potential of an electrode under the passage of current and the thermodynamic value of the electrode potential in the absence of electrolysis for the same experimental conditions.

As used herein when referring to a cathode, the term "hydrogen overpotential" designates an overpotential associated with the liberation of hydrogen gas at the cathode. A cathode having high hydrogen overpotential minimizes hydrogen evolution during electrolysis, and thus facilitates iron electrodeposition. Known and non-limiting examples of materials having high hydrogen overpotential are given, for example, in Cardarelli[13] and in U.S. Pat. No. 5,911,869 to Exxon Research and Engineering and Co.[14]. Advantageously, the cathode material also allows stripping of the iron metal deposit. Non limiting examples of suitable cathode materials include titanium (of commercial or higher purity), titanium alloy (for example titanium palladium ASTM grade 7), zirconium (of commercial or higher purity), zirconium alloy, zinc (of commercial or higher purity), zinc alloy, cadmium (of commercial or higher purity), cadmium alloy, tin (of commercial or higher purity), tin alloy, copper (of commercial or higher purity), copper alloy, lead (of commercial or higher purity), lead alloy, niobium (of commercial or higher purity), niobium alloy, gold (of commercial or higher purity), gold alloy, mercury or metallic amalgam with mercury.

It is to be understood that a cathode having high hydrogen overpotential may consist of a bulk of a material having high hydrogen overpotential or may simply be coated with such a material.

As used herein when qualifying a cathode, the expression "having a hydrogen overpotential higher than that of iron" means that, in absolute value, the cathode has an overvoltage, at $200 \, A \cdot m^{-2}$, greater than about 425 mV in $0.5 \, mol \cdot dm^{-3}$ HCl at 25° C.

It is to be understood that the relevance of performing some optional steps of the process according to the present invention depends on the presence in the feedstock of given elements to be recovered. For example, not all feedstocks possibly useable in a process according to the present invention contain vanadium. Of course, a vanadium-separation step is only relevant if vanadium is present in the feedstock.

As used herein, the expression "vanadium-separation step" essentially designates a step wherein vanadium is separated from iron. Thus it may correspond to, but it is not necessarily a step wherein vanadium gets recovered as a substantially pure vanadium compound.

In an embodiment wherein the feedstock is in a solid and/or anhydrous form, the process generally first consists in leaching the feedstock, such as an anhydrous chlorinator dust by-produced during carbo-chlorination of titania-rich feedstocks (e.g., weathered ilmenite, titanium slag, natural and synthetic rutiles), with either one of: hot acidic process water, hot diluted hydrochloric acid, hot spent acid coming from the high pressure acid leaching of titanium slags or even from spent liquors by-produced during the pickling of steel. After complete dissolution of all metal chlorides, the resulting slurry is filtered to separate the remaining insoluble solids comprising unreacted titania slag, silica and silicates, titanium dioxide fines and coke fractions from soluble metal chlorides in the form of an iron-rich metal chloride liquor or solution. The filter cake obtained is carefully washed with a minimum of acidic water, dewatered, dried and eventually sent back to the carbo-chlorination plant or discarded and landfilled (depending on its titanium and coke values and content of silica), while the wash water may be reused in the first leaching step.

In another embodiment, wherein the feedstock is in the form of a slurry, a leaching may help dissolve the soluble solids before a solid-liquid separation, for example by filtration.

In still another embodiment, wherein the feedstock is in a clear aqueous liquid form, i.e. that of an iron-rich metal chloride solution, a leaching step is of no particular interest.

Afterwards, four main process variants can be used for recovering both chlorine and metal values from the iron-rich metal chloride solution, based on the same general principle of simultaneous recovery of metal iron and chlorine values from an iron-rich metal chloride solution by electrolysis, using a catholyte adjusted to a pH below about 2 and a cathode having a hydrogen overpotential higher than that of iron.

In a particular embodiment of the process according to the present invention, as illustrated in FIG. 1, the pH of the iron-rich metal chloride solution is first adjusted to between about 0.6 and about 1.8, with alkaline reagents such as, but not limited to, magnesia or ammonium hydroxide or a mixture thereof, after which the solution is ready for electrolysis.

Figure 5:
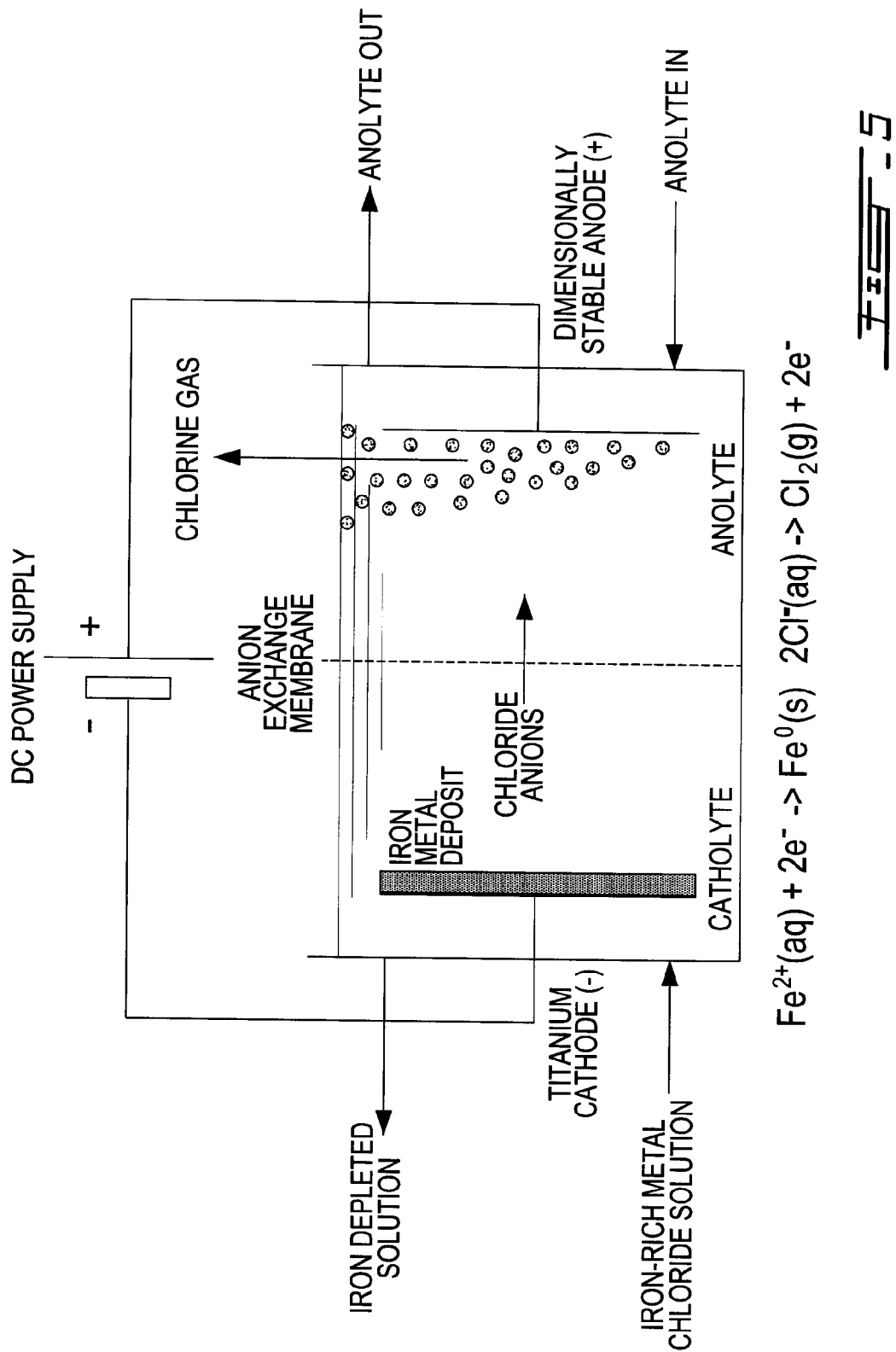
FIG. 5 is a schematic illustration of a two-compartment electrolyser used in some embodiments of the present invention with major electrochemical reactions occurring at each electrode.

Still in reference to FIG. 1, the electrolytic stage consists in circulating the pH-adjusted iron-rich metal chloride solution inside the cathodic compartment of an electrolyser. The iron-rich metal chloride solution thus acts as catholyte. The electrolyser consists of two compartments separated by an anion-exchange membrane (as illustrated in FIG. 5). The cathodic compartment comprises a cathode made of titanium or titanium alloy (usually ASTM grade 7), while the anodic compartment has a dimensionally stable anode for the evolution of chlorine (DSA™-Cl$_2$). The anolyte that circulates in loop in the anodic compartment is made of a mixture of about 20 wt. % hydrochloric acid and about 17 wt. % magnesium chloride with about 10,000 ppm of ferric iron (Fe$^{3+}$) as corrosion inhibitor.

During electrolysis, at the above-mentioned pH ranging between about 0.6 and about 1.8, iron metal deposits at the cathode along with precipitated crystals of vanadium pentoxide. The precipitation of vanadium pentoxide results from the consumption of hydrogen cations at the cathode and local increase of the pH above the precipitation point of hydrated vanadium pentoxide. On the other hand, chloride anions migrate through the permeable anion exchange membrane towards the anodic compartment and discharge as chlorine gas at the surface of the anode according to the following electrochemical reactions:

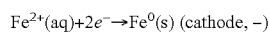
Fe$^{2+}$(aq)+2e$^-$→Fe$^0$(s) (cathode, −)

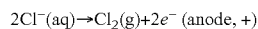
2Cl$^-$(aq)→Cl$_2$(g)+2e$^-$ (anode, +)

The overall reaction therefore being:

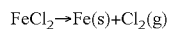
FeCl$_2$→Fe(s)+Cl$_2$(g)

Side-reactions may also occur, such as the evolution of oxygen at the anode:

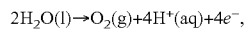
2H$_2$O(l)→O$_2$(g)+4H$^+$(aq)+4e$^-$, hydrogen evolution at the cathode:

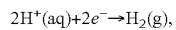
2H$^+$(aq)+2e$^-$→H$_2$(g), along with the reduction of traces of ferric cations:

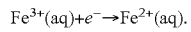
Fe$^{3+}$(aq)+e$^-$→Fe$^{2+}$(aq).

On the cathode side, these undesired side reactions are minimized by maintaining the pH of the catholyte below pH of about 2 and by using a cathode material having a high overpotential for the discharge of hydrogen so as to prevent hydrogen evolution. More specifically, the cathode materials used in the process according to the present invention have hydrogen overpotential higher (in absolute value) than that of iron in given electrolysis conditions. Preferably, the pH of the catholyte is maintained between about 0.6 and about 1.8, more preferably between about 0.6 and about 1.5, still more preferably between about 0.6 and about 1.1, and most preferably between about 0.9 and 1.1. In addition, using an inert atmosphere of nitrogen above the cathodic compartment may help preventing the oxidation of the ferrous cations.

On the anode side, the utilization of a dimensionally stable anode for chlorine evolution may impede the evolution of oxygen gas, thereby ensuring the production of a high purity chlorine gas.

The electrolysis is usually conducted between about 40° C. and about 110° C. under a galvanostatic control. The overall current density is comprised between about 200 and about 2000 A/m$^2$ with a cell voltage ranging from about 1.2 to about 3.5 V per cell. In this specific embodiment, the faradaic efficiency is usually greater than about 90% and the average specific energy consumption is between about 2.1 and about 6.2 kWh per kg of iron and between about 1.1 and about 3.5 kWh per kilogram of chlorine gas.

The wet chlorine gas evolved is recovered by conventional methods. For example, as shown in FIG. 1, it may be recovered by suction, cooled by passing it through a graphite heat exchanger, and dried by passing it through a mist eliminator and several concentrated sulfuric acid spray-towers (scrubbing). Finally the dry and cold chlorine gas may be compressed and liquefied, thus being ready to be transported or stored on-site for future use.

The thick plates of electrodeposited iron metal are mechanically stripped from the titanium cathode. The plates are then immersed into a hot lye of concentrated sodium hydroxide (50 wt. % NaOH) to selectively dissolve the vanadium oxides; traces of oxydiser, such as, but not limited to, potassium chlorate, are added to convert all the vanadium into pentavalent vanadium and pure iron metal is separately recovered. Ammonia along with ammonium chloride (NH$_4$Cl) and/or ammonium hydroxide are then added to the remaining liquor in order to precipitate all the vanadium as ammonium metavanadate (NH$_4$VO$_3$). Thus in such specific embodiment, a vanadium-separation step occurs after the electrolysis step.

Sulfuric acid is added to the spent iron-free electrolyte, or iron-depleted solution, exiting the electrolyser, for removing calcium as insoluble calcium sulfate dihydrate (CaSO$_4$.2H$_2$O) and entraining optional traces of radioactivity, mostly as radium sulfate.

The remaining spent magnesium- and aluminum-rich brine is then pyro-hydrolysed to yield refractory spinel beads, pellets or granules ready to be used in the manufacture of refractories or proppants, while recovering azeotropic hydrochloric acid.

It is to be understood that changing the pH of the catholyte in the process of FIG. 1, for example to 0.3 to 0.5, would allow vanadium not to precipitate along with iron codeposition but to remain in the iron-rich, becoming the iron-depleted solution, thus performing a vanadium separation step during electrolysis. This is however not a preferred embodiment in a process using a two-compartment electrolyser since the iron obtained may be, although slightly, contaminated by vanadium pentoxide and the Faradaic efficiency may drop.

Figure 2:
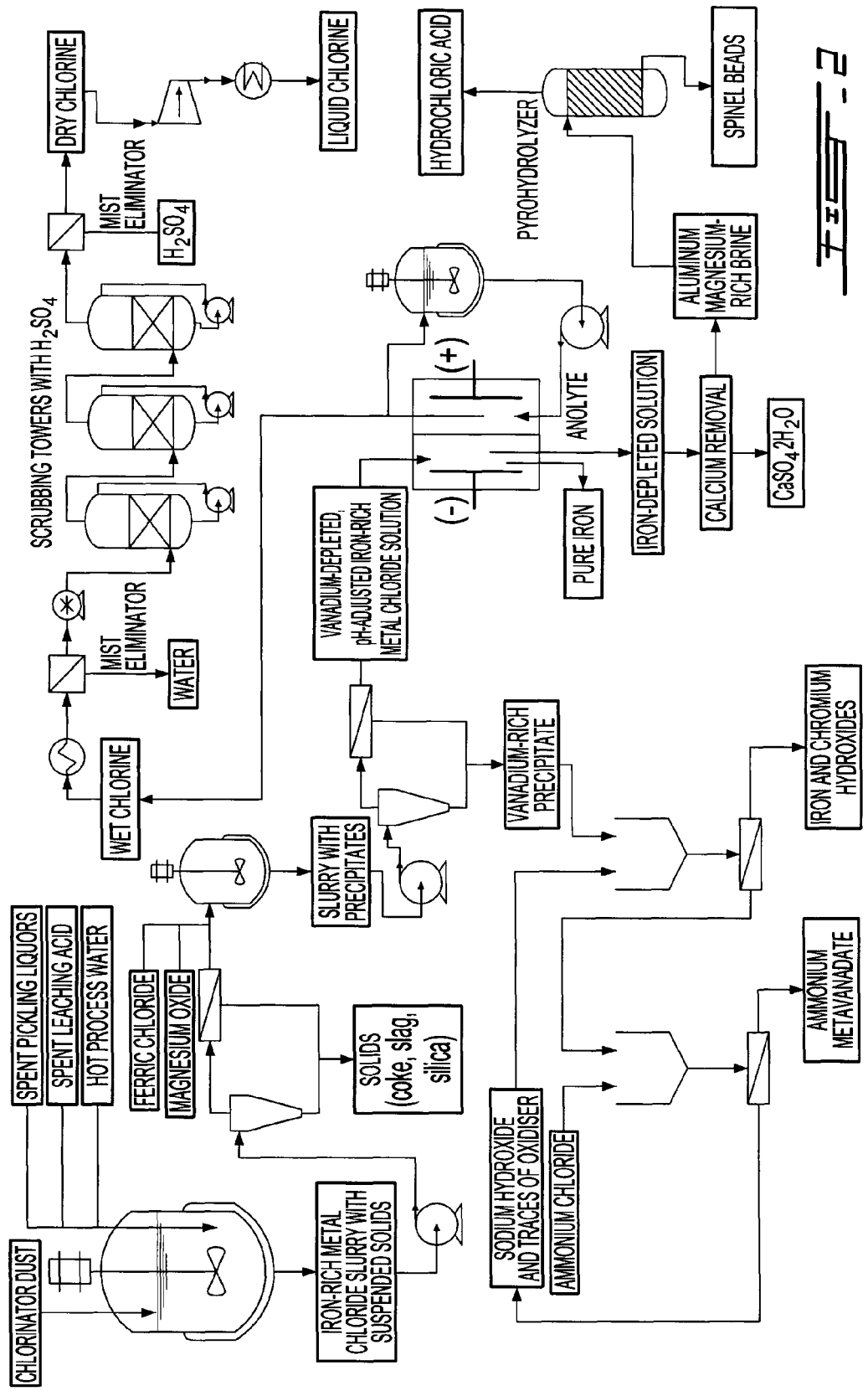
FIG. 2 is a flow-sheet diagram illustrating the various steps of the entire electrochemical process according to a second embodiment of the present invention, based on a two-compartment electrolyser and performing electrolysis with a pH-adjusted iron-rich metal chloride solution from which the vanadium has been removed by precipitation prior to its introduction in the cathodic compartment.

In another particular embodiment of the process according to the present invention, as generally illustrated in FIG. 2, the exact vanadium content of the iron-rich metal chloride solution is determined by a conventional method and a stoichiometric amount of potassium chlorate ($KClO_3$) is introduced to oxidize all the vanadium into vanadium (V) (not shown). A corresponding amount of iron (III) chloride is then added and the pH of the solution is adjusted to between about 0.5 and about 3 with alkaline reagents such as for instance magnesia or ammonium oxide, hydroxide or a mixture thereof. This precipitates together vanadium (V) and chromium (VI), entrained by co-precipitation with the ferric hydroxide (Fe$(OH)_3$). The gelatinous vanadium-rich precipitate is then removed from the slurry by a known technique of either decantation, centrifugation or filtration. The so-obtained vanadium-rich precipitate, for example in the form of a filter cake, is then dissolved in a minimum amount of concentrated solution of sodium hydroxide and oxidised with traces of oxydiser. The remaining ferric and chromic hydroxides are discarded and the vanadium is selectively precipitated as ammonium metavanadate ($NH_4VO_3$) by addition of ammonium hydroxide ($NH_4OH$) and/or ammonium chloride ($NH_4Cl$), and recovered.

The clear filtrate or supernatant from the vanadium separation step is pH-adjusted at a pH below 2, preferably between about 0.6 and about 1.8 and thus ready for electrolysis, in the form of a vanadium-depleted and pH adjusted iron-rich metal chloride solution (not shown).

Still in reference to FIG. 2, the electrolysis consists in circulating the vanadium-depleted and pH-adjusted iron-rich metal chloride solution inside the cathodic compartment of an electrolyser. The iron-rich metal chloride solution thus acts as catholyte. Similarly to FIG. 1, the electrolyser consists of a cell divided by an anion-exchange membrane (as illustrated in FIG. 5). The cathodic compartment has a cathode made of titanium metal or a titanium alloy (usually ASTM grade 7). The anodic compartment has a dimensionally stable anode for the evolution of chlorine (DSA™-$Cl_2$). The anolyte that circulates in loop is made of a mixture of about 20 wt. % hydrochloric acid and about 17 wt. % magnesium chloride with about 10,000 ppm of ferric iron ($Fe^{3+}$) as corrosion inhibitor. During electrolysis, pure iron metal is deposited at the cathode, while chloride anions migrate through the permeable anion exchange membrane to the anodic compartment and discharge as chlorine gas at the surface of the anode according to the following electrochemical reactions:

$Fe^{2+}(aq)+2e^-\rightarrow Fe^0(s)$ (cathode, −)

$2Cl^-(aq)\rightarrow Cl_2(g)+2e^-$ (anode, +)

The overall reaction being:

$FeCl_2=Fe(s)+Cl_2(g)$.

Again, side-reactions may also occur, such as the evolution of oxygen at the anode:

$2H_2O(l)\rightarrow O_2(g)+4H^+(aq)+4e^-$, hydrogen evolution at the cathode:

$2H^+(aq)+2e^-\rightarrow H_2(g)$, along with the reduction of traces of ferric cations:

$Fe^{3+}(aq)+e^-\rightarrow Fe^{2+}(aq)$.

Again, on the cathode side, these undesired side reactions are minimized by maintaining the pH of the catholyte below 2 and by using a cathode material having high hydrogen overpotential. The cathode materials suitable for use in the process according to the present invention have a hydrogen overpotential higher (in absolute value) than that of iron in given electrolysis conditions. Preferably, the pH of the catholyte is maintained between about 0.6 and about 1.8, more preferably between about 0.6 and about 1.5, still more preferably between about 0.6 and about 1.1, and most preferably between about 0.9 and 1.1. In addition, using an inert atmosphere of nitrogen above the cathodic compartment may help preventing the oxidation of the ferrous cations.

On the anode side, the utilization of a dimensionally stable anode for chlorine evolution may impede the evolution of oxygen gas, thereby ensuring the production of a high purity chlorine gas.

In the embodiment of FIG. 2, the electrolysis is usually conducted between about 40° C. and about 110° C. under a galvanostatic control. The overall current density is comprised between about 200 and about 2000 A/m² with a cell voltage ranging from about 1.9 to about 3.5 V per cell. In this specific embodiment, the faradaic efficiency is usually greater than 90% and the specific energy consumption is usually between about 2 and about 3.7 kWh per kg of iron and between about 1.6 and about 3 kWh per kilogram of chlorine gas.

In this specific embodiment, the wet chlorine gas evolved is recovered by suction, is cooled by passing it through a graphite heat exchanger, and dried by passing it through a mist eliminator and several concentrated sulfuric acid spray-towers (scrubbing). Finally the dry and cold chlorine gas is compressed and liquefied, thus being ready to be transported or stored on-site for future re-utilization.

The thick electrodeposited plates of pure iron metal are mechanically stripped from the titanium cathode.

Concentrated sulfuric acid is added to the spent iron-free electrolyte, or iron-depleted solution, exiting the electrolyser for removing calcium as insoluble calcium sulfate dihydrate ($CaSO_4.2H_2O$) and entraining optional traces of radioactivity, mostly as radium sulfate.

The remaining spent magnesium- and aluminum-rich brine is then pyrohydrolysed to yield refractory spinel beads, pellets or granules ready to be used in the manufacture of refractories or proppants while recovering azeotropic hydrochloric acid.

Figure 3:
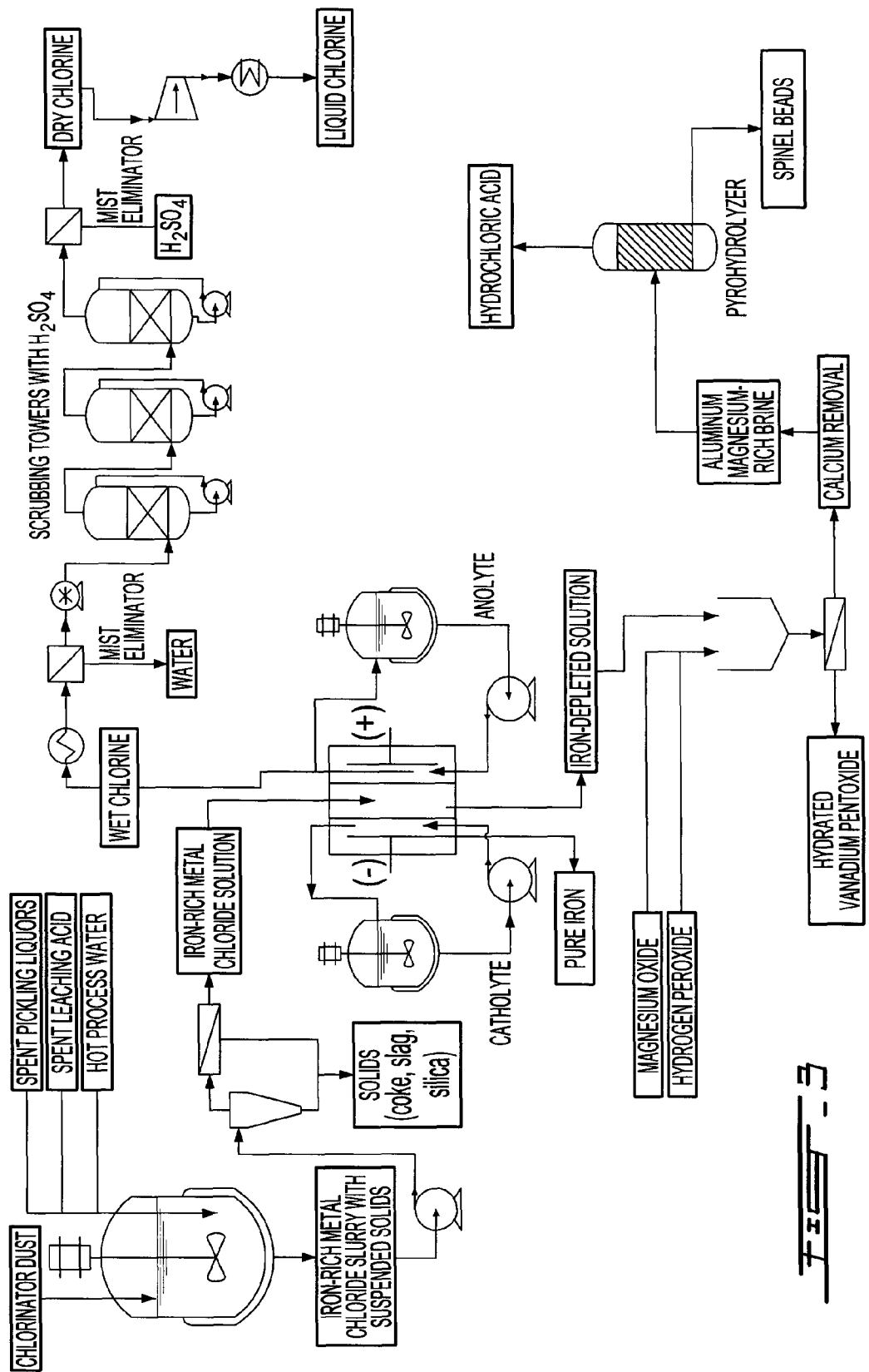
FIG. 3 is a flow-sheet diagram illustrating the various steps of the entire electrochemical process according to a third embodiment of the present invention, using a three-compartment electrolyser and performing electrolysis with a non-adjusted iron-rich metal chloride solution.
Figure 6:
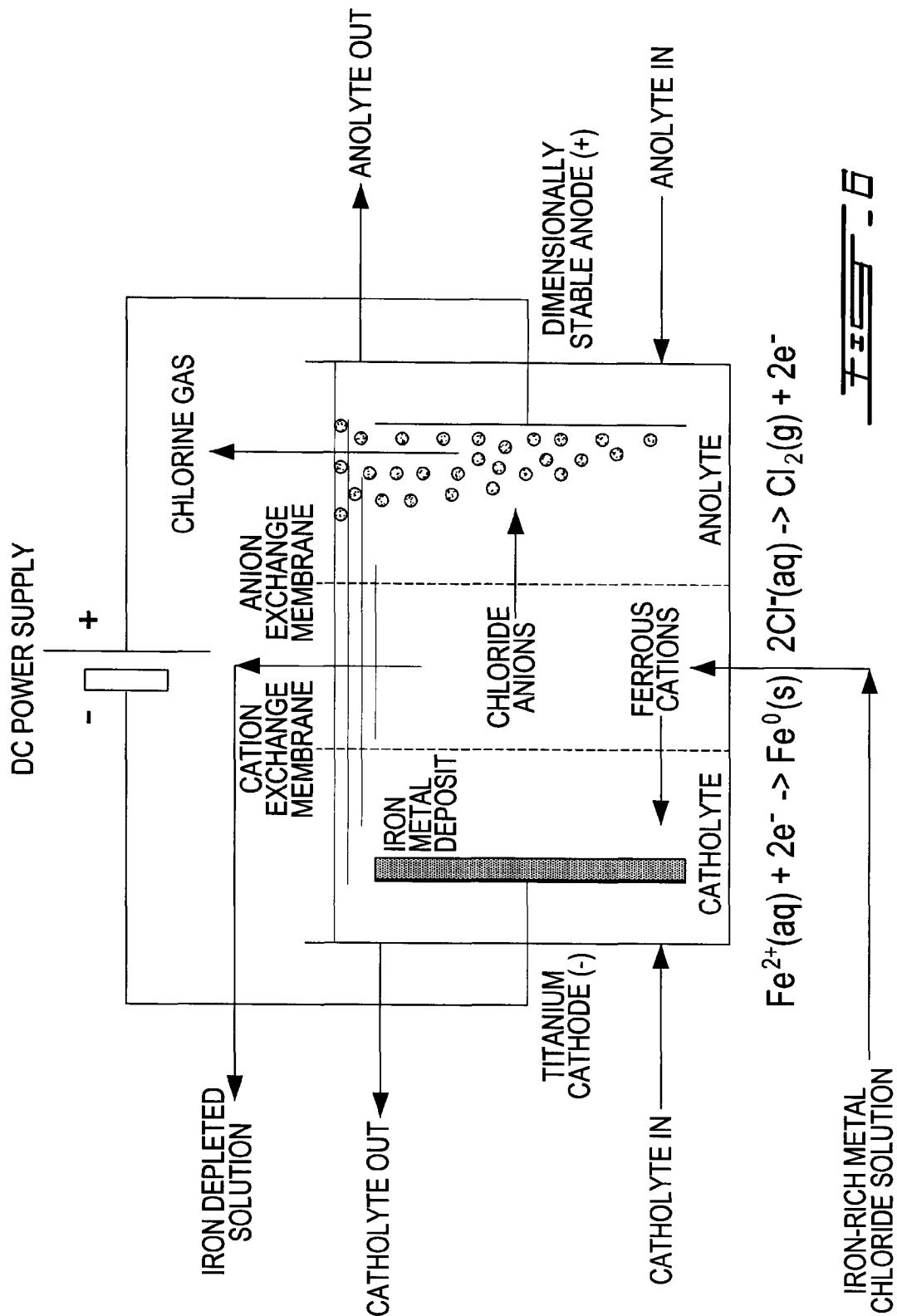
FIG. 6 is a schematic illustration of a three-compartment electrolyser used in some embodiments of the present invention with major electrochemical reactions occurring at each electrode.

In another particular embodiment of the process according to the present invention, as illustrated in FIG. 3, the iron-rich metal chloride solution is sent without any prior treatment (such as pH adjustment) to the electrochemical plant. The electrolyser design used in this process (as illustrated in FIG. 6) has three compartments: (i) a cathodic compartment with a titanium plate cathode, (ii) an anodic compartment comprising a dimensionally stable anode for the evolution of chlorine, and (iii) a central compartment separated from the cathodic compartment by a cation-exchange membrane and from the anodic compartment by an anion exchange membrane. The catholyte circulating inside the cathodic compartment is a saturated solution of ferrous chloride (about 350 g/L $FeCl_2$) with magnesium chloride (about 220 g/L $MgCl_2$), while the anolyte is made of about 20 wt. % hydrochloric acid and about 17 wt. % magnesium chloride with about 10,000 ppm of ferric iron ($Fe^{3+}$) as corrosion inhibitor. The pH of the catholyte is adjusted below pH 2, preferably between about 0.6 and about 1.8, more preferably between about 0.6 and about 1.5, still more preferably between about 0.6 and about 1.1, most preferably between about 0.9 and about 1.1. The iron-rich metal chloride solution is passed through the central compartment continuously.

During the electrolysis (FIG. 6), ferrous cations of the iron-rich metal chloride solution migrate through the cation exchange membrane and are reduced to pure iron metal onto the titanium cathode while the chloride anions migrate through the anion exchange membrane towards the dimensionally stable anode where they are oxidized, thereby producing chlorine gas that evolves. The electrochemical reactions involved are as follows:

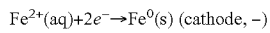

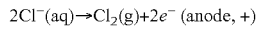

The overall reaction being:

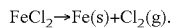

The electrolysis is conducted between about 40 and about 110° C. under galvanostatic control with an overall current density comprised between about 200 and about 2000 A/m² with a cell voltage ranging from about 1.9 to about 3.5 V per cell. In this embodiment, the faradaic efficiency is usually greater than about 90%.

In this embodiment, the pure and wet chlorine gas evolved is recovered by suction, is cooled by passing it through a graphite heat exchanger and dried by passing it through a mist eliminator and several concentrated sulfuric acid spray-towers. Finally the dry and cold chlorine gas is compressed and then liquefied, thus being ready to be transported or stored on-site for future utilization.

The thick plates of electrodeposited pure iron metal are mechanically stripped from the titanium cathode.

Hydrogen peroxide ($H_2O_2$) is added to the iron-depleted solution exiting the central compartment to oxidize all the traces of vanadium (IV, and V) to vanadium (V). Then magnesium oxide (MgO) is added to adjust the pH to about 1.8-2.2, which leads to the quantitative precipitation of hydrated vanadium pentoxide ($V_2O_5 \cdot 25 H_2O$). The precipitate is removed by decantation, filtration or centrifugation, dried and calcined to yield flakes of vanadium pentoxide ($V_2O_5$) (not shown).

Afterwards, sulfuric acid is added to the resulting iron and vanadium-free brines for removing calcium as insoluble calcium sulfate dihydrate and entraining traces of radioactivity, mostly as radium. The spent magnesium- and aluminum-rich brine is then pyrohydrolysed to yield refractory spinel beads, pellets or granules ready to be used in the manufacture of refractories or proppants, while recovering azeotropic hydrochloric acid.

It is to be noted that the pH of the iron-rich metal chloride solution may or may not be adjusted prior to electrolysis when using a three-compartment electrolyser. Such an adjustment could, for example, serve to effect a vanadium precipitation along with iron deposition, as above, although it is not a preferred embodiment here.

Figure 4:
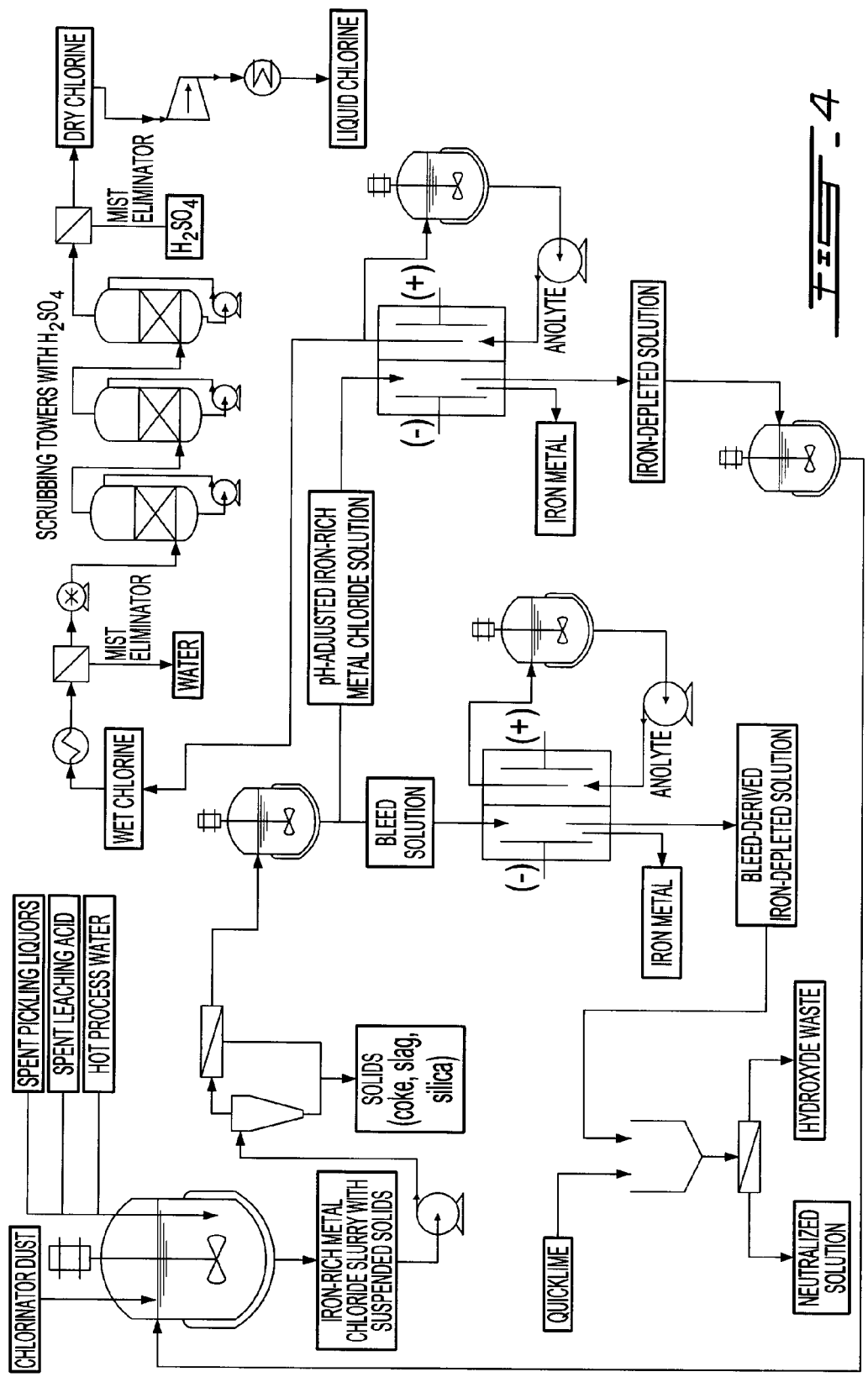
FIG. 4 is a flow-sheet diagram illustrating the various steps of the entire electrochemical process according to a fourth embodiment of the present invention, using a two-compartment electrolyser and recirculating at least part of the iron-depleted solution.

In another particular embodiment of the process according to the present invention, as generally illustrated in FIG. 4, the catholyte that exits the two-compartment electrolyser as an iron-depleted solution is recirculated, for example into the tank where the chlorinator dust (or other feedstock) is dissolved. For clarity of the illustration, the chlorinator dust is assumed to be free of vanadium. It is however possible to include a vanadium separation system as shown previously, if necessary.

The recirculation of the iron-depleted solution causes (1) an increase of the overall iron deposition/recovery upon several passes into the electrolytic cell and (2) a build-up of un-electrolysed chlorides, in particular of non-iron metal chloride impurities, in the iron-rich metal chloride solution to be electrolysed, which has been found to help improving the iron deposition faradaic current efficiency.

In this embodiment, the recirculation rate is advantageously high enough to maximize the iron deposition current efficiency and low enough to avoid crystallization onset. In other words, the optimal recirculation rate in a specific embodiment may be defined as the highest recirculation rate that does not onset any precipitation or crystallization of undesired, new solid phases in the catholyte (such as, but not limited to, $AlCl_3$ or $FeCl_2$). Since the critical chloride concentration at which precipitation occurs depends on the metal chloride content of the catholyte (i.e. the nature of the metal and concentration of chlorides), the value of the optimal recirculation rate depends, among other elements, on the feedstock composition. The value of the optimal recirculation rate also depends on the desired overall and single-pass iron chloride conversions, for a given $FeCl_2$ concentration entering the electrolyser. In any case, the optimal recirculation rate for a given feedstock composition may be determined using routine mass balance calculation and validated experimentally.

The recirculation rate may be expressed in several different manners. For the simple purpose of clarity and in a non-limiting fashion, the recirculation rate is herein expressed as a mass ratio between the flow rate of recirculation, i.e. the flow rate of the iron-depleted solution being recirculated into an upstream reservoir, and the sum of (1) the flow rate of recirculation and (2) the flow rate of the bleed. The bleed corresponds to the withdrawn or non-recirculated portion of the solution in the process. The recirculation rate may vary from zero (no recirculation) to 100%, i.e. complete recirculation (no bleed). The complete recirculation may be used, for example, when the concentration of impurities in the feedstock is very low.

In general, the recirculation rate may be established above about 60%, preferably above about 80%, more preferably above about 90% or about 95%. As a non-limiting example, considering a chlorinator dust feedstock meeting the composition of table 1, for a desired single-pass conversion of about 30%, overall conversion of about 90% and $FeCl_2$ concentration entering the electrolyser of about 20%, the recirculation rate may range between about 95 and about 98%, for example between about 96 and 97%.

In this particular embodiment, the pH of the iron-rich metal chloride solution is periodically adjusted (using for example bases such as MgO or CaO or acids such as HCl) to a value that is advantageously low enough to avoid formation of undesired metal hydroxides and high enough to minimise hydrogen evolution at the cathode side. The optimal pH in a given industrial process depends, for example, of the chlorinator dust or spent acid composition, which varies according to the process used upstream of the present iron- and chlorine-recovery process and to the chosen recirculation rate. Such optimal pH may routinely be assessed experimentally for a given feedstock prior to practicing the process according to the present invention.

As a non-limiting example, when the iron-rich metal chloride solution contains $AlCl_3$ as a predominant non-iron metal chloride, the pH of the catholyte may be periodically adjusted to a predetermined pH that ranges between about −1 and about 2, preferably between about −1 and about −0.1, more preferably between about −0.6 and about −0.3.

As another non-limiting example, when the iron-rich metal chloride solution contains $MgCl_2$ as a predominant non-iron metal chloride, the pH of the catholyte may be periodically adjusted to a predetermined pH that ranges between about 0.3 and about 1.8, preferably between about 0.6 and about 1.5, more preferably between about 0.6 and about 1.1, most preferably between about 0.9 and about 1.1.

Still in reference to FIG. 4, the electrolytic stage consists in circulating the pH-adjusted iron-rich metal chloride solution inside the cathodic compartment of a two-compartment electrolyser (as illustrated in FIG. 5). The iron-rich metal chloride solution thus acts as catholyte. As shown previously, the cathodic compartment of the electrolyser comprises a cathode made of titanium or titanium alloy (usually ASTM grade 7), while the anodic compartment has a dimensionally stable anode for the evolution of chlorine (DSA™-$Cl_2$). The anolyte that circulates in loop in the anodic compartment is made of a mixture of about 20 wt. % hydrochloric acid and about 17 wt. % magnesium chloride with about 10,000 ppm of ferric iron ($Fe^{3+}$) as corrosion inhibitor.

During electrolysis, iron metal deposits at the cathode. On the other hand, chloride anions migrate through the permeable anion exchange membrane towards the anodic compartment and discharge as chlorine gas at the surface of the anode according to electrochemical reactions similar to those described in previous embodiments.

On the cathode side, the evolution of hydrogen is minimized by maintaining the pH of the catholyte below pH of about 2 and by using a cathode material having a high overpotential for the discharge of hydrogen so as to prevent hydrogen evolution. More specifically, the cathode materials used in the process according to the present invention have hydrogen overpotential higher (in absolute value) than that of iron in given electrolysis conditions. In addition, using an inert atmosphere of nitrogen above the cathodic compartment may help preventing the oxidation of the ferrous cations.

On the anode side, the utilization of a dimensionally stable anode for chlorine evolution may impede the evolution of oxygen gas, thereby ensuring the production of a high purity chlorine gas.

The electrolysis is usually conducted between about 40° C. and about 110° C. under a galvanostatic control. The overall current density is comprised between about 200 and about 2000 A/$m^2$ with a cell voltage ranging from about 1.2 to about 4 V per cell. In this specific embodiment, the faradaic efficiency (for iron deposition) is usually greater than about 90% and the average specific energy consumption is between about 2.1 and about 6.2 kWh per kg of iron and between about 1.1 and about 3.5 kWh per kilogram of chlorine gas.

As previously shown, the wet chlorine gas evolved is recovered by conventional methods and the thick electrodeposited plates of pure iron metal are mechanically stripped from the titanium cathode.

The bleed solution may be electrolysed in a single-pass electrolyser in order to recover more iron and chlorine. The bleed-derived iron-depleted solution may be treated as any iron-depleted solution, as shown in previous embodiments or simply neutralised with quicklime (see FIG. 4).

A number of parameters of the process according to the present invention may be varied, as explained below.

Cathode materials suitable for use in the process of the present invention (as bulk or coating materials) are materials having a high overpotential for the evolution of hydrogen, more specifically a hydrogen overpotential higher than that of iron in given electrolysis conditions. Advantageously, the cathode material also allows stripping of the iron metal deposit. Non limiting examples of suitable cathode materials include titanium (of commercial or higher purity), titanium alloy (for example titanium palladium ASTM grade 7), zirconium (of commercial or higher purity), zirconium alloy, zinc (of commercial or higher purity), zinc alloy, cadmium (of commercial or higher purity), cadmium alloy, tin (of commercial or higher purity), tin alloy, copper (of commercial or higher purity), copper alloy, lead (of commercial or higher purity), lead alloy, niobium (of commercial or higher purity), niobium alloy, gold (of commercial or higher purity), gold alloy, mercury or metallic amalgam with mercury.

Anode materials suitable for use in the process of the present invention include (as bulk or coating materials) (1) dimensionally stable anodes for the evolution of chlorine (DSA™-$Cl_2$) of the type [M/MxOy-AzOt] made of a metallic substrate or base metal M coated with a mixed metal oxides (MMO) as electrocatalyst, wherein M is a refractory metal or an alloy with a valve action property such as titanium, titanium alloy, zirconium, zirconium alloy, hafnium, hafnium alloy, vanadium, vanadium alloy, niobium, niobium alloy, tantalum, tantalum alloy, MxOy is a metallic oxide of a valve metal forming a thin and impervious layer protecting the base metal such as $TiO_2$, $ZrO_2$, $HfO_2$, $NbO_2$, $Nb_2O_5$, $TaO_2$, and $Ta_2O_5$, and AzOt is an electrocatalytic metal oxide of a noble metal or more often an oxide of the platinum group metals (PGMs) such as $RuO_2$, $IrO_2$, $PtOx$ and also sometimes a metallic oxide such as $SnO_2$, $Sb_2O_5$, $Bi_2O_3$; (2) Bulk electronically conductive ceramics such as: sub-stoichiometric titanium oxides such as Magneli-Anderson phases with general formula $Ti_nO_{2n-1}$ (n is an integer $>=3$), conductive oxides with the spinel structure ($AB_2O_4$, wherein A=Fe(II), Mn(II) or Ni(II), and B=Al, Fe(III), Cr(III), Co(III)) or conductive oxides with the perovskite structure ($ABO_3$, wherein A=Fe (II), Mn(II), Co(II) or Ni(II), and B=Ti(IV)) or with the pyrochlore structure $AB_2O_7$; or (3) carbon-based materials such as graphite, impervious graphite, or vitreous carbon.

The anolyte composition used in the process of the present invention advantageously comprises hydrochloric acid, a salt such as $MgCl_2$, NaCl, KCl, LiCl, $CaCl_2$ or mixtures thereof and Fe(III) as corrosion inhibitor. For example, suitable anolyte compositions may vary in the following ranges: about 10 to about 37 wt. % hydrochloric acid (preferably about 20%); about 1 to about 20 wt. % $MgCl_2$, NaCl, KCl, LiCl, $CaCl_2$ or mixtures thereof (preferably about 16%) with about 10 to about 12,000 ppm wt. Fe(III) as corrosion inhibitor (preferably 8,000 to 10,000 ppm wt).

In an embodiment of the present invention involving a three-compartment electrolyser, the catholyte composition may vary in the following ranges: about 1 to about 450 g/L of iron (II) chloride (preferably about 335 g/L), about 1 to about 350 g/L $MgCl_2$ (preferably about 250 g/L), about 1 to about 350 g/L $CaCl_2$ (preferably about 250 g/L) or about 350 g/L of a mixture of $MgCl_2$ and $CaCl_2$ (preferably about 250 g/L); it may also further comprise 0 to about 10 g/L of free HCl, and/or about 1 to about 350 g/L $AlCl_3$ (preferably about 250 g/L). In an embodiment where $MgCl_2$ is predominant among non-iron metal chlorides, the catholyte pH generally ranges between about 0.6 and about 1.5, preferably about 0.6 to about 1.1, more preferably about 0.9 to about 1.1. In an embodiment where $AlCl_3$ is predominant among non-iron metal chlorides, the catholyte pH generally ranges between about −1 and 2, preferably between about −1 to about −0.1, more preferably between about −0.6 and about −0.3.

The reaction temperature may range between about 40 and about 110° C., preferably between about 80 and about 95° C. Most preferably, the operating temperature is about 85° C.

The volume flow rate of both anolyte and catholyte advantageously ranges between about 0.1 and about 100 L/min, preferably between about 0.1 and about 30 L/min. Most preferably, the volume flow rate is about 2 L/min in a given electrolytic cell.

The cathodic current density during electrolysis, to produce a dendrite-free smooth deposit of iron, advantageously ranges between about 50 and about 1000 A/$m^2$. Preferably in such case, the cathodic current density is about 500 A/$m^2$.

The cathodic current density during electrolysis, to produce an iron powder, advantageously ranges between about 3000 and about 5000 A/m². Preferably in such case, the cathodic current density is about 4000 A/m².

Figure 14:
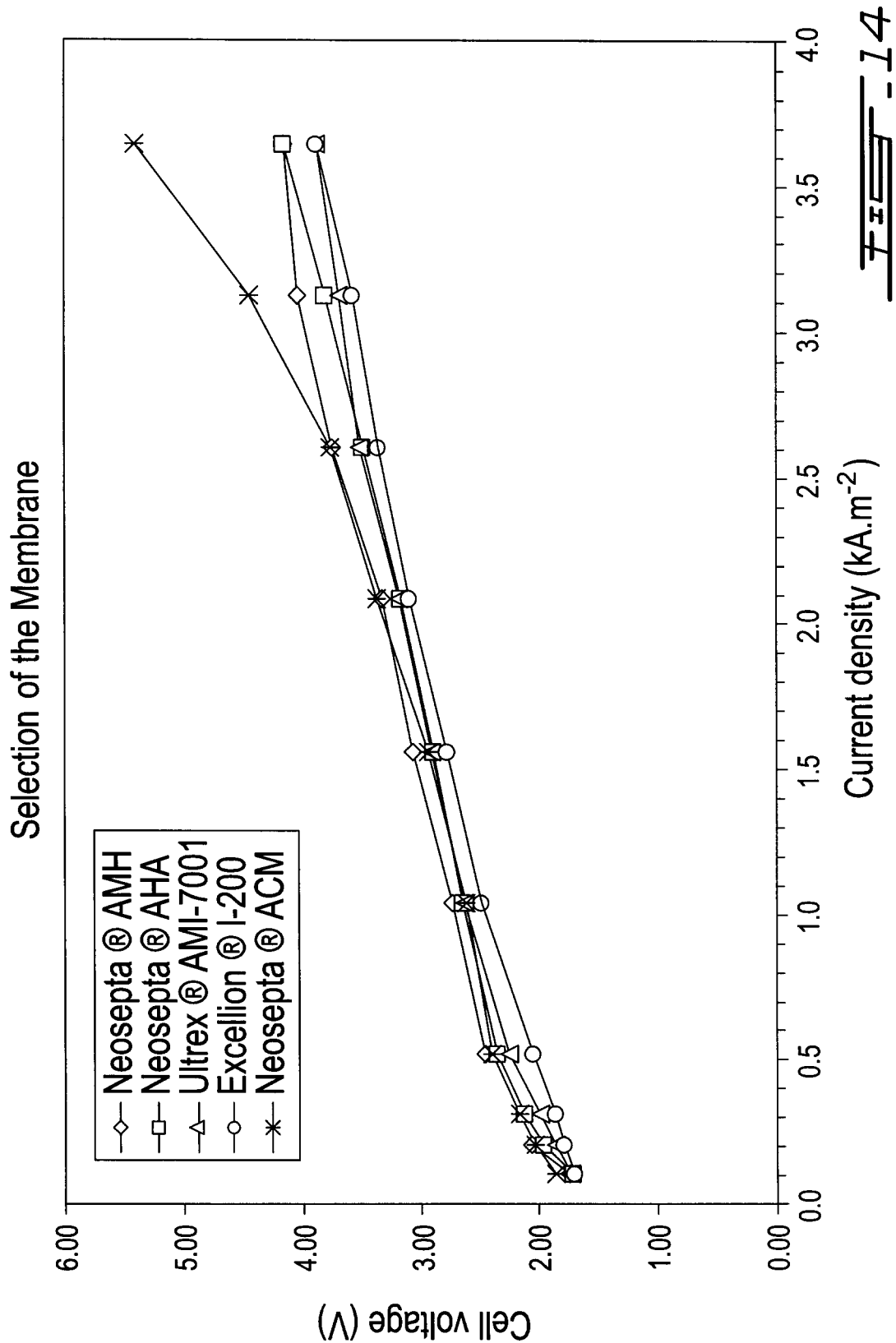
FIG. 14 is a graphical illustration showing the polarization curves as obtained in Example 9 (selection of an anion exchange membrane)

Separators used in the process of the present invention may be passive, such as a conventional diaphragm separator, or active such as ion exchange membranes. Preferably, the separators used are ion exchange membranes. Anion exchange membranes and cation exchange membranes used in the process of the present invention are conventional membranes. Non-limiting examples of suitable anion exchange membranes are presented in the Examples below (FIG. 14).

The interelectrode gap may also be varied, with a well-known impact on the ohmic drop. It is advantageously about 6 mm.

In an embodiment wherein (part of) the iron-depleted solution is recirculated, the recirculation may be made either into the tank where the chlorinator dust or other feedstock is diluted, or directly into the tank where the pH adjustment is made.

It is to be understood that the bleed solution may be withdrawn from the system at any stage. It may for example constitute part of the iron-depleted solution.

The recirculation of the iron-depleted solution may also be made in an embodiment using a three-compartment electrolyser. As previously shown, the iron-rich metal chloride solution is then passed through the central compartment.

It is also to be understood that the recirculation of metal chlorides, the metal part of which does not electrodeposits as readily as iron (for example Al or Mg), allows obtaining substantially pure iron. In cases where alloys involving iron are desirable, a co-deposition of iron and other metal(s) such as, but not limited to, Zn and/or Ni is possible.

The present invention is illustrated below in further details by way of the following non-limiting examples.

Example 1

Preparation of the Iron-Rich Metal Chloride Solution and Separation of Unreacted Solids A batch of 10 kilograms of anhydrous chlorinator dust, a by-product of carbo-chlorination of upgraded titania-rich slag (UGS) was provided by a titanium dioxide pigment producer. The material was first mixed with hot acidified water at 80° C. that initially contained 10 g/L of free hydrochloric acid (HCl) in order to leach out all the soluble metal chlorides. After complete dissolution of the soluble salts, the resulting warm and dense slurry was filtered under vacuum using large 240-mm inner diameter Buchner funnels (CoorsTek) with a capacity of 4.5 liters each. The Buchners were installed ontop of a 10-liter Erlenmeyer vacuum flask (Kimax) connected to a vacuum pump. The filtration media used were disks of ash-less filter paper No. 42 (Whatman). In order to increase throughput, four of these Buchner-Erlenmeyer assemblies were operated simultaneously in parallel.

The filter cakes thus obtained were carefully washed with a minimum of hot and acidified deionised water, dewatered by acetone, placed into in a stainless steel pan and then oven dried at 110° C. overnight. From microscopic examination and chemical analysis, the remaining insoluble solids comprised mainly unreacted titanium slag, silica and silicates, precipitated fines of titanium dioxide, and coke fractions. An example of the chemical composition of these solids obtained after drying is given in Table 3 below.

TABLE 3

Composition of insoluble solids after hot acidic water leaching, and drying (wt. %)

| Chemical component | Formula | Percentage |
|---|---|---|
| Carbon | C | 54.00 |
| Titanium dioxide | $TiO_2$ | 21.07 |
| Silica | $SiO_2$ | 14.38 |
| Iron sesquioxide | $Fe_2O_3$ | 4.42 |
| Sulfur | S | 1.44 |
| Other metal oxides | — | 4.69 |
| Total = | | 100.00 |

After filtration and washing completion, wash water and the four filtrates totalized 18 L, which were collected into a large 5 US-gallons cylindrical tank made of polypropylene. The concentration of metal chlorides in this initial solution after leaching is presented in Table 4. Since the concentration of iron (II) chloride in the filtrate (i.e 83.7 g/L) was too low for performing the electrolysis at a cathodic current density sufficient to obtain a smooth deposit, the solution was further concentrated by evaporation into a large Erlenmeyer flask heated onto a hot plate (Corning). The evaporation was stopped when the volume of the solution was reduced by four (4.5 L). At that stage, the concentration of metal chlorides was greatly increased and reached 335 g/L for iron (II) chloride when sampled at 80° C. (see Table 4, concentrated solution). Hence, in order to prevent the crystallization of ferrous chloride upon cooling at room temperature, the solution was immediately transferred into a 10-L jacketed glass reactor (Kimble-Contes) heated by circulating hot water supplied by a heating bath (Lauda GmbH). The temperature of the solution was maintained at 80° C. at all times. The solution was also acidified by adding minute amounts of concentrated hydrochloric acid to maintain the concentration of free acid around 10 g/L. Actually, at a pH below 0.5, the air oxidation of ferrous iron (Fe2+) into ferric iron (Fe3+) is slowed down. Moreover, a blanket of nitrogen gas was also maintained above the solution for the same purpose of preventing oxidation, and small cm-size polypropylene balls floating above the solution helped preventing an important water loss by evaporation. The solution then prepared and stored was ready for the subsequent steps.

TABLE 4

Concentration of metal chlorides in the iron-rich solutions (in g/L)

| Metal chloride | Formula | Initial solution after leaching (Example 1) | Concentrated solution by evaporation (Example 1) | After V precipitation and pH-adjusted (Examples 4 & 5) |
|---|---|---|---|---|
| Iron (II) chloride | $FeCl_2$ | 83.7 | 335 | 350(*) |
| Magnesium (II) chloride | $MgCl_2$ | 19.7 | 79 | 200 |
| Aluminum (III) chloride | $AlCl_3$ | 20.3 | 81 | 70 |
| Manganese (II) chloride | $MnCl_2$ | 13.4 | 53 | 35 |
| Vanadium (V) oxychloride | $VOCl_2$ | 5.7 | 22 | 0.1 |

TABLE 4-continued

Concentration of metal chlorides in the iron-rich solutions (in g/L)

| Metal chloride | Formula | Initial solution after leaching (Example 1) | Concentrated solution by evaporation (Example 1) | After V precipitation and pH-adjusted (Examples 4 & 5) |
|---|---|---|---|---|
| Chromium (III) chloride | CrCl$_3$ | 2.4 | 9.5 | 0.4 |
| Calcium (II) chloride | CaCl$_2$ | 2.1 | 8.4 | 7.8 |
| Free hydrochloric acid | HCl | 10 | 10 | 0.00 |
| Density at 25° C. | kg/m$^3$ | 1171 | 1259 | 1360 |
| pH = | | | 0.4 | 0.5 | 0.9 |

(*)some iron powder was added before increasing pH to convert remaining traces of iron (III) cations.

Example 2

Example 2a

Electrolysis of the Initial Concentrated Iron-Rich Metal Chloride Solution at pH 1.1

The previous iron-rich metal chloride concentrated solution from Example 1 was simply adjusted at a pH of 1.1 by adding minute amount of magnesia and then circulated inside the cathodic compartment of an electrolyser. The electrolyser consisted of a filter press design model MP cell from Electrocell AB (Sweden) with two compartments separated by an anion-exchange membrane made of Excellion® I-200 (SnowPure LLC). The geometric electrode and membrane surface area was 100 cm$^2$ and the spacing between each electrode and the separator was 6 mm.

The cathodic compartment comprised a cathode plate made of a titanium palladium alloy (ASTM grade 7; Ti-0.15Pd) supplied by Titanium Industries. Prior to electrolysis the cathode was chemically etched by immersing it into a fluoro-nitric acid mixture (70 vol % conc. HNO$_3$, 20 vol. % conc. HF and 10 vol. % H$_2$O) and then rinsing it thoroughly with deionised water until no trace of acid remained.

The anodic compartment was equipped with a dimensionally stable anode (DSA™-Cl$_2$) supplied by Magneto BV (Netherlands) made of a plate of a titanium-palladium alloy substrate coated with a high loading of ruthenium dioxide (RuO$_2$) acting as electrocatalyst for promoting the evolution of chlorine (Ti-0.15Pd/RuO$_2$). The anolyte that recirculated in loop consisted of an aqueous solution of 20 wt. % hydrochloric acid with 17 wt. % magnesium chloride (MgCl$_2$) and 10,000 ppm of ferric iron (Fe$^{3+}$) as corrosion inhibitor, the balance being deionised water. The electrolysis was performed galvanostatically at an overall current density of 500 A/m$^2$. The operating temperature was 80° C. and the volume flow rate of both catholyte and anolyte was 1 L/min. At that current density, the measured overall cell voltage was 2.528 V. During electrolysis, pure iron metal deposited at the cathode. On the other hand, chloride anions migrated through the permeable anion exchange membrane towards the anodic compartment and discharged as chlorine gas at the surface of the anode according to the following electrochemical reactions:

$$Fe^{2+}(aq) + 2e^- \rightarrow Fe^0(s) \text{ (cathode, -)}$$

$$2Cl^-(aq) \rightarrow Cl_2(g) + 2e^- \text{ (anode, +)};$$

The overall electrochemical reaction being:

$$FeCl_2 \rightarrow Fe(s) + Cl_2(g)$$

Figure 7:
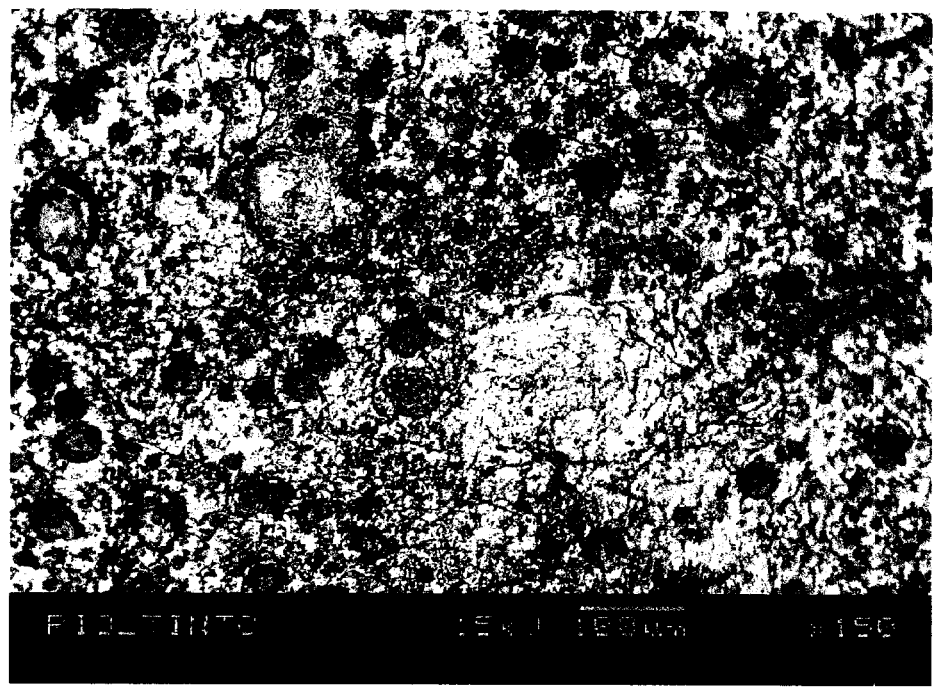
Figure 8:
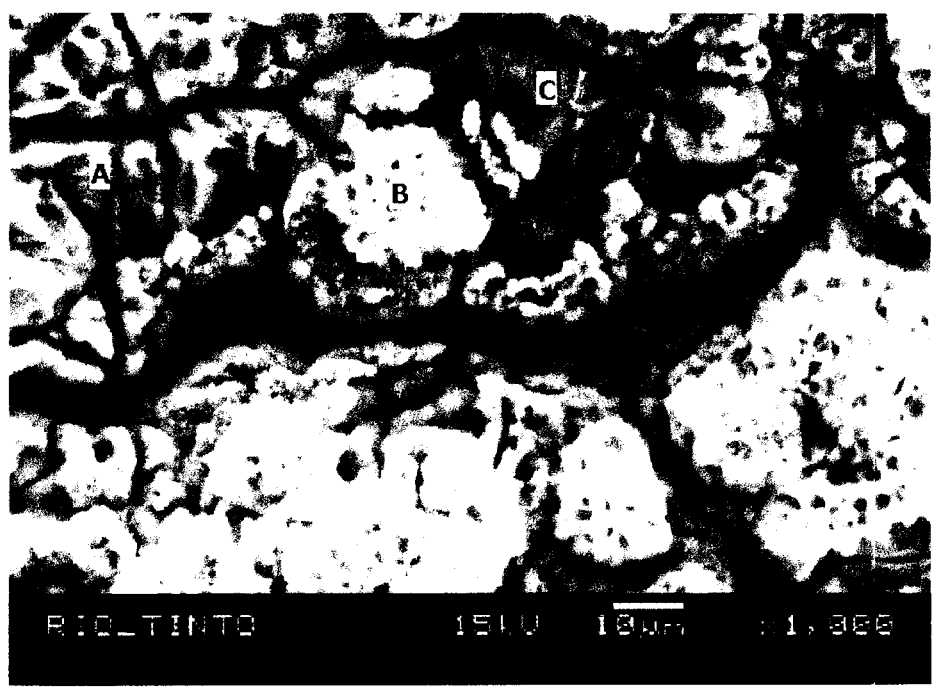

After two hours of continuous electrolysis, the power was shut off and the electrolyser was opened. The electrodeposited rough and blackened thin plate was easily stripped from the titanium cathode by mechanical means. The measured thickness was circa 0.126 mm and its mass was only 8.30 g. After close examination under the scanning electron microscope (SEM) it was in fact an iron metal electrodeposit with small, embedded grains of pure vanadium pentoxide crystals (See FIGS. 7 and 8). After performing an ultimate chemical analysis of the bulk sample, it was made up of 68 wt. % iron and 32 wt. % vanadium pentoxide (V$_2$O$_5$). The codeposition of vanadium pentoxide was probably due to the fact that at the cathode surface, the hydronium cations (H$^+$) were reduced to hydrogen that evolved, and hence locally this H$^+$ depletion lead to an increase of pH, which yielded a precipitation of vanadium pentoxide particles, embedded into the iron electrodeposit. From these experimental figures, the estimated faradaic current efficiency was 80% and the specific energy consumption at 500 A/m2 was 3.033 kWh per kg of deposit (iron+vanadium pentoxide) or 4.460 kWh per kg of pure iron.

The wet chlorine gas evolved was recovered by suction using downstream a peristaltic pump (Masterflex L/S Digital Pump) with Viton tubing. The chlorine gas was first cooled by passing it through an empty washing borosilicated glass bottle immersed into a ice bath, the mist and moisture content were then removed by passing the gas through several flasks filled with concentrated sulfuric acid (98 wt. % H$_2$SO$_4$), and finally the dry and cold chlorine gas was totally absorbed into a saturated solution of potassium iodide (KI) liberating iodine according to the following reaction:

$$Cl_2(gas) + 3K^+_{aq} + 3I^-_{aq} \rightarrow 3K^+_{aq} + I_3^-_{aq} + 2Cl^-_{aq}$$

After completion of the electrolysis, the free iodine was titrated by a standardized solution of sodium thiosulfate (Na$_2$S$_2$O$_3$) according to the reaction:

$$4Na^+_{aq} + 2S_2O_3^{2-}_{aq} + K^+_{aq} + I_3^-_{aq} \rightarrow 4Na^+_{aq} + S_4O_6^{2-}_{aq} + K^+_{aq} + 3I^-_{aq}$$

Based on the titration, the anodic faradaic efficiency in chlorine was established at 78%. The difference between the two current efficiencies (anode and cathode) is most probably due to some hydrogen evolution at the cathode and some oxygen evolution at the anode. The anodic specific energy consumption at 500 A/m2 was hence 2.45 kWh per kilogram of pure chlorine gas (i.e., 7.652 kWh per m3 (NTP: 0° C., 101.325 kPa)).

Example 2b

Electrolysis of the Initial Concentrated Iron-Rich Metal Chloride Solution at pH 0.30

Figure 9:
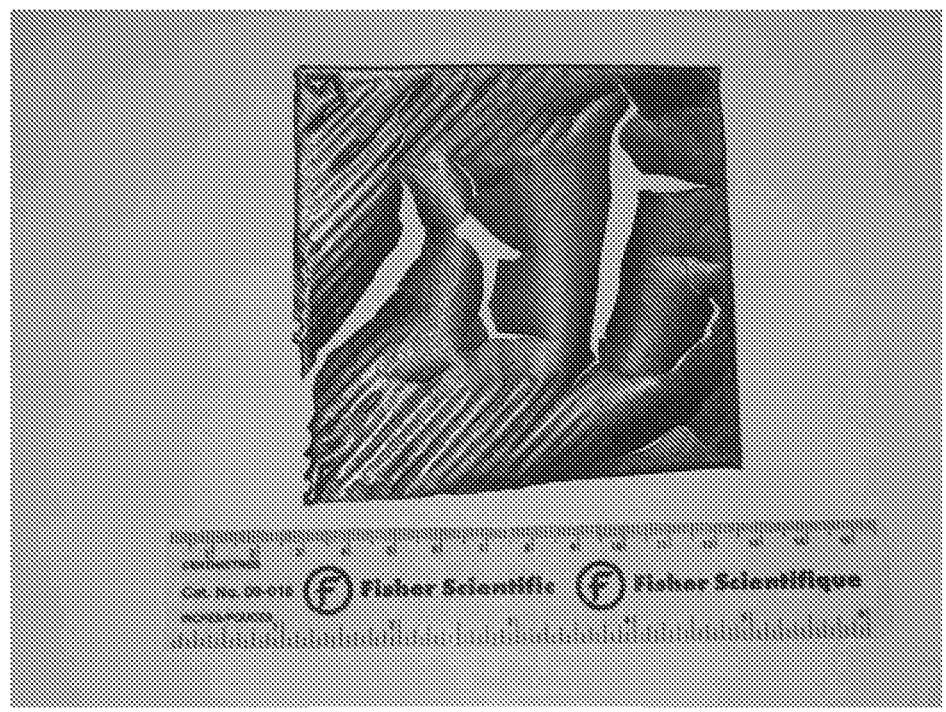
FIG. 9 is a photograph showing a smooth iron electrodeposit with a small amount of vanadium, as obtained in Example 2b.

As an alternative to Example 2a, the iron-rich metal chloride concentrated solution from Example 1 was adjusted at a rather low pH of 0.30, so as to prevent an increase of pH above the precipitation pH of vanadium pentoxide at the cathode surface, but not too low however, so as not to favour the evolution of hydrogen. This was done by adding and circulating hydrochloric acid in the cathodic compartment of the electrolyser. The electrolyser was identical to that described in Example 2a but this time the electrolysis was performed galvanostatically at a current density of 1000 A/m². At that current density and low pH, the measured cell voltage was 2.865 V. After one hour, a bright and smooth electrodeposit was easily stripped from the titanium cathode (see FIG. 9). It had a mass of only 6.24 g. It was made of 99.88 wt. % iron and only 0.12 wt. % vanadium pentoxide ($V_2O_5$). From these experimental figures, the estimated faradaic current efficiency was 60% and the specific energy consumption at 1000 A/m2 was 4.584 kWh per kg of iron.

The wet chlorine gas evolved was recovered by the same method as that described in Example 2a.

Example 3

Recovery of Iron and Vanadium from the Iron-Vanadium Deposit of Example 2a

The metallic deposit was ground into a pulverisette mill (Fritsch) and the resulting powder was treated under pressure with a caustic lye of sodium hydroxide (NaOH 50 wt. %) at 100° C. for two hours into a 125 mL PTFE lined digestion bomb (Parr Company). Upon cooling, the solution was filtrated to recover the insoluble iron metal fines. Then excess ammonium chloride ($NH_4Cl$) was added to the vanadium-rich liquor in order to precipitate the pure ammonium metavanadate ($NH_4VO_3$). The pure ammonium metavanadate was later calcined inside a porcelain boat in dry air at 400° C. in a box furnace (Fisher Isotemp) to give off ammonia ($NH_3$) and water vapor ($H_2O$), thereby yielding a red-orange powder of vanadium pentoxide. The powder was then transferred into an Inconel crucible and melted at 700° C. in air and the melt was cast onto a cool steel plate. The resulting solidified black mass with a submetallic luster was then ground into a two disks vibratory cup mill with a hardmetal liner (Fritsch GmbH) using acetone as grinding aid and coolant. The product thus obtained was technical grade vanadium pentoxide powder.

Example 4

Removal of Vanadium from the Iron-Rich Metal Chloride Solution from Example 1 Prior to Electrolysis A stoechiometric amount of sodium chlorate ($NaClO_3$) was added to the initial solution prepared in Example 1 to oxidize all the vanadium cations ($V^{4+}$, $V^{5+}$) into pentavalent vanadium ($V^{5+}$) according to the reaction:

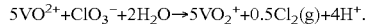

$$5VO^{2+}+ClO_3^-+2H_2O \rightarrow 5VO_2^+ +0.5Cl_2(g)+4H^+.$$

It is to be noted that the addition of sodium chlorate could also have been done after concentration of the solution.

Afterwards, an equivalent amount of ferric chloride ($FeCl_3$) was introduced into the solution to enhance a co-precipitation of vanadium pentoxide and iron hydroxide. Such co-precipitation was used to promote complete precipitation of vanadium. Indeed, should vanadium be the only species to precipitate, the precipitation would stop at a vanadium concentration below about 0.02 mol/L in the solution.

Red brown hydrated vanadium (V) pentoxide starts to precipitate at about pH 1.8 while brown iron (III) hydroxide starts to precipitate at about pH 2.0. Thus, when both species are present, they co-precipitate at pH 1.8-2.0. In the present case, the pH of the solution was raised by careful addition of a slurry of slacked magnesia ($Mg(OH)_2$) until the pH reached 2.0 but never above to avoid the precipitation of black mixed ferroso-ferric hydroxides. At that pH, the complete co-precipitation of hydrated vanadium pentoxide ($V_2O_5.250H_2O$) and iron (III) hydroxide occurred in the form of a gelatinous red brown precipitate. The co-precipitates were separated by filtration using a similar set-up to that described in Example 1.

The resulting filtrate was then acidified again to adjust pH close to 0.5 and stored into the jacketed reactor until the next electrolysis step.

The red-brown gelatinous filter cake was removed from the filter paper and digested into a warm caustic lye of sodium hydroxide (NaOH 50 wt. %). Upon cooling, both solution and sludge were poured into 250 mL centrifugation polypropylene bottles and centrifuged with a robust benchtop centrifuge (CL4 from Thermo Electron) at 10,000 revolutions per minute. The insoluble and dense gelatinous residue, mainly composed of iron hydroxide ($Fe(OH)_3$), was separated at the bottom, carefully washed with hot alkaline water (pH 10), centrifuged again and then discarded. Then excess ammonium chloride ($NH_4Cl$) was added to the vanadium-rich supernatant in order to precipitate the pure ammonium metavanadate ($NH_4VO_3$). The pure ammonium metavanadate was later calcined inside a porcelain boat in dry air at 400° C. in a box furnace (Fisher Isotemp) to give off ammonia ($NH_3$) and water vapour ($H_2O$), thereby yielding a red-orange powder of vanadium pentoxide. The powder was then transferred into an Inconel crucible, melted at 700° C. in air and cast onto a cool steel plate. The solidified black mass with a submetallic luster was then ground into a two disks vibratory cup mill with a hardmetal liner (Fritsch GmbH) using acetone as grinding aid and coolant. The product thus obtained was technical grade vanadium pentoxide powder containing some chromium, iron and manganese as major impurities.

Example 5

Electrolysis of the Vanadium-Free Iron Rich Solution from Example 4

Figure 10:
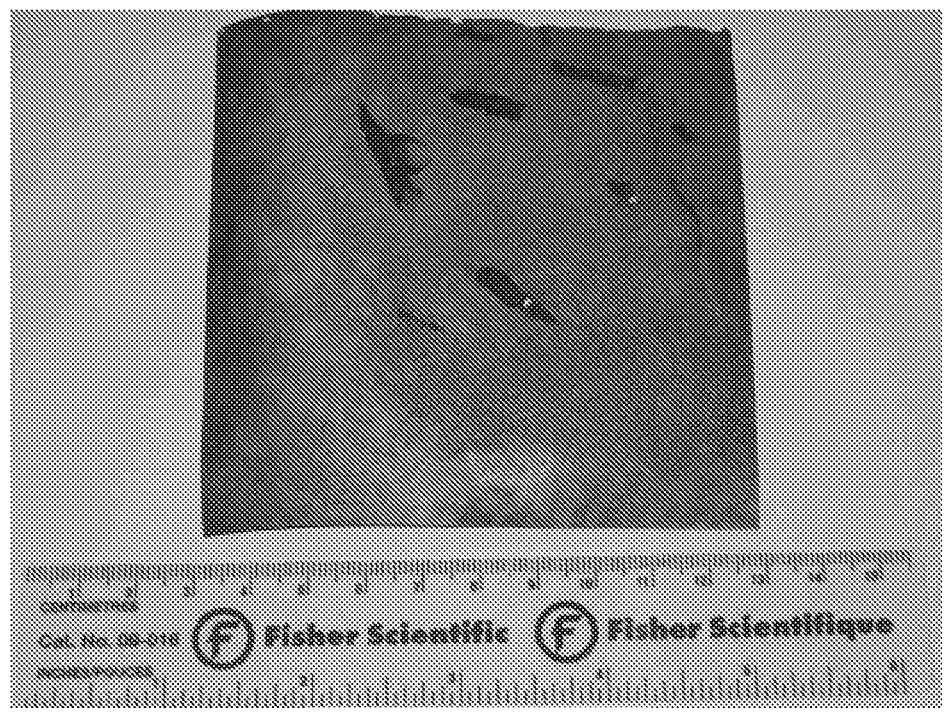
FIG. 10 is a photograph showing an electrodeposited thin plate of iron metal, as obtained in Example 5.

The iron-rich metal chloride solution from which vanadium was removed during Example 4 was adjusted at a pH of 0.9 by adding minute amount of magnesia and circulated inside the cathodic compartment of an electrolyser. Its composition prior to electrolysis is presented in Table 4, last column. The electrolyser was identical to that described in examples 2a and 2b. The electrolysis was also performed galvanostatically at a current density of 200 A/m2. The operating temperature was 85° C. and the volume flow rate of both catholyte and anolyte was 1 L/min. At that current density, the measured cell voltage was 1.85 V. After five hours of continuous electrolysis, the power was shut off and the electrolyser was opened. The electrodeposited thin plate of iron metal was easily stripped from the titanium cathode by mechanical means. The thickness was 0.126 mm and its mass was 10.20 g (See FIG. 10). It was a smooth and soft material with some pitting probably due to attached hydrogen bubbles. From these experimental figures, the estimated faradaic current efficiency was 97.9% and the specific energy consumption at 200 A/m2 was only 1.87 kWh per kg of iron. The purity of iron was 99.99 wt. % Fe with no traces of other metallic elements.

Example 6

Electrolysis of the Iron-Rich Metal Chloride Solution with a Three Compartment Electrolyser The iron-rich metal chloride concentrated solution from Example 1 was simply adjusted at a pH of 1.1 by adding minute amount of magnesia and then circulated inside the central compartment of an electrolyser. The electrolyser consisted of a filter press design model MP cell from Electrocell AB (Sweden) with three compartments separated by an anion-exchange membrane (Excellion® I-200) and a cation exchange membrane (Excellion® I-100), both manufactured by SnowPure LLC. The geometric electrode and membrane surface area was 100 cm² and the spacing between each electrode and the separator was 6 mm and also 6 mm between each membrane.

The cathodic compartment comprised a cathode plate made of a titanium palladium alloy (ASTM grade 7; Ti-0.15Pd) supplied by Titanium Industries. Prior to electrolysis the cathode was chemically etched by immersing it into a fluoro-nitric acid mixture (70 vol % conc. $HNO_3$, 20 vol. % conc. HF and 10 vol. % $H_2O$) and then rinsing it thoroughly with deionised water until no trace of acid remained.

The anodic compartment was equipped with a dimensionally stable anode (DSA™) supplied by Magneto BV (Netherlands) made of a plate of a titanium-palladium alloy substrate coated with a high loading of ruthenium dioxide ($RuO_2$) acting as electrocatalyst for promoting the evolution of chlorine (Ti-0.15Pd/RuO2).

The catholyte that circulated in loop within the cathodic compartment was an aqueous solution of 350 g/L iron (II) chloride and 300 g/L magnesium (II) chloride adjusted at a pH of 1.1, while the anolyte that circulated in loop within the anodic compartment consisted of an aqueous solution of 20 wt. % hydrochloric acid with 17 wt. % magnesium chloride ($MgCl_2$) and 10,000 ppm of ferric iron (Fe3+) as corrosion inhibitor the balance being deionised water.

The electrolysis was performed galvanostatically at a current density of 500 A/m2. The operating temperature was 80° C. and the volume flow rate of both catholyte, anolyte and initial solution was 1 L/min. At that current density, the measured overall cell voltage was 3.502 V. During electrolysis, ferrous cations from the iron-rich metal chloride solution crossed the Excellion® I-100 cation exchange membrane, and pure iron metal deposited at the cathode. On the other hand, chloride anions migrated through the permeable anion exchange membrane towards the anodic compartment and discharged as chlorine gas at the surface of the anode.

Figure 11:
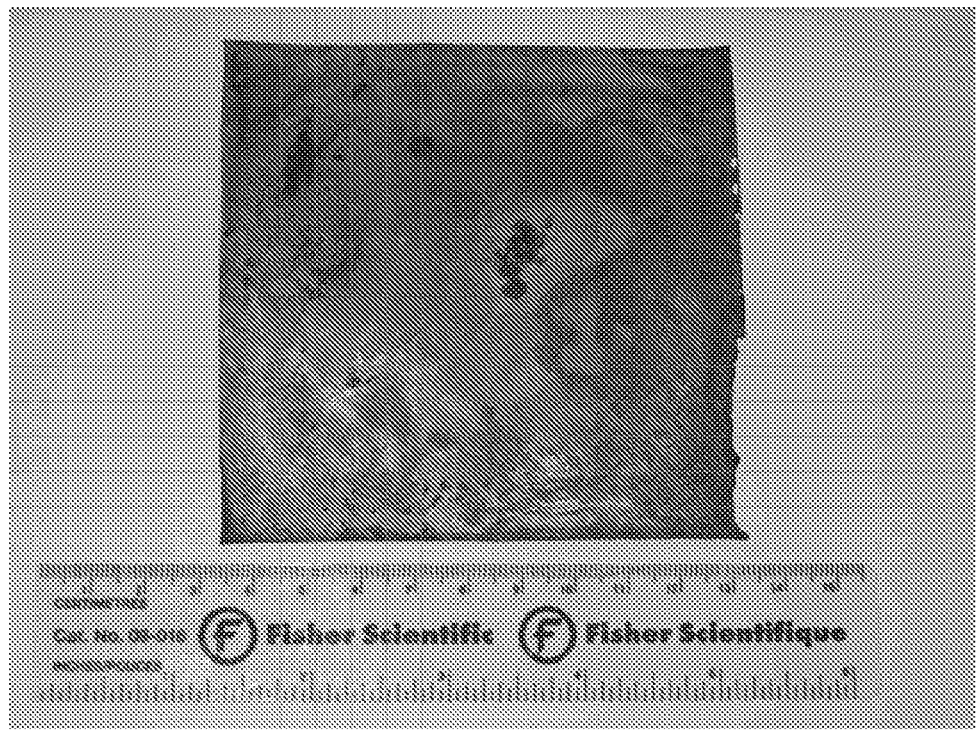
FIG. 11 is a photograph showing an iron metal deposit plate, as obtained in Example 6.
Figure 17:
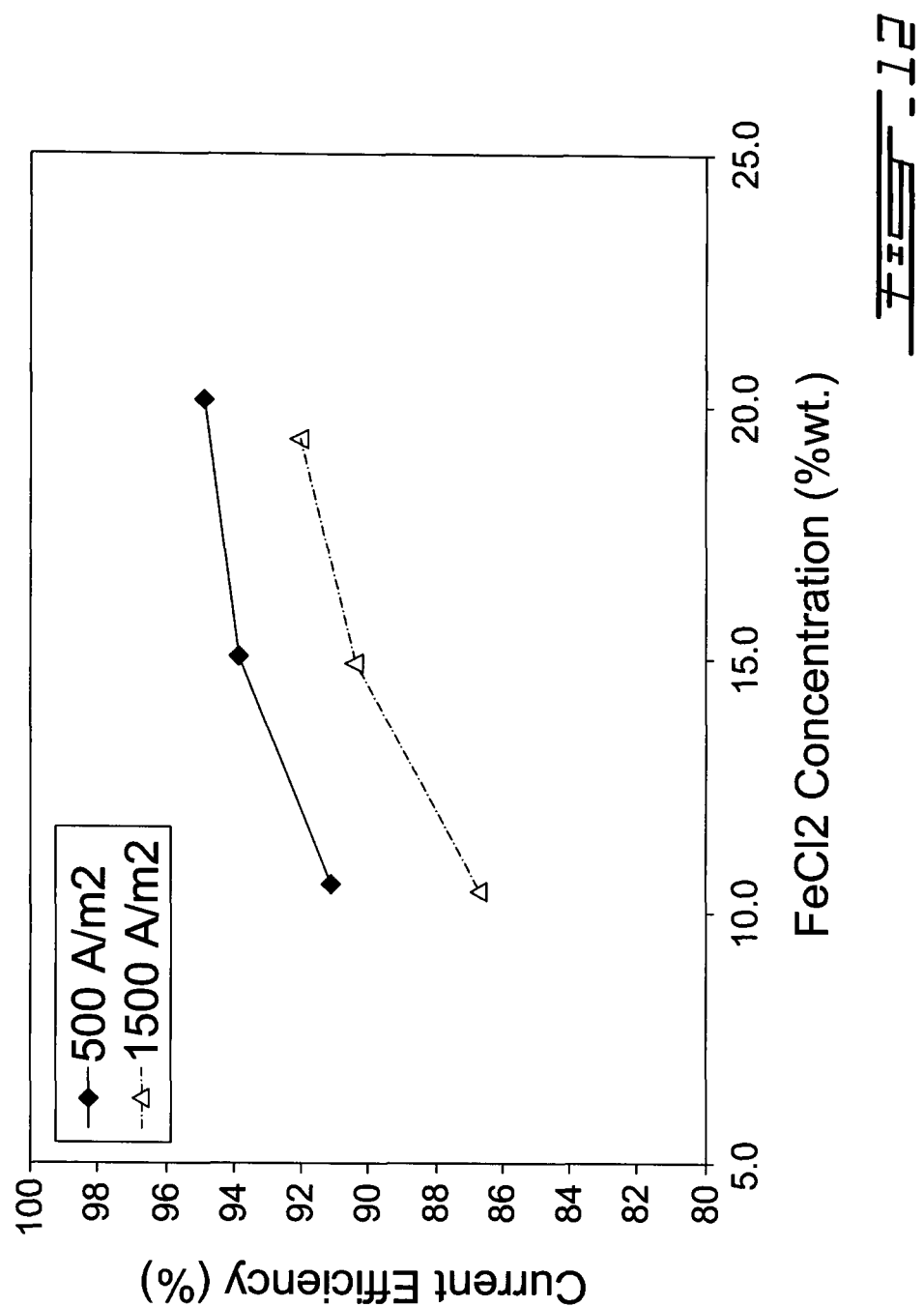

After two hours of continuous electrolysis, the power was shut off and the electrolyser was opened. The bright iron metal deposit plate was easily stripped from the titanium cathode by mechanical means. The measured thickness was circa 0.126 mm and its mass was 10.04 g (See FIG. 11). From these experimental figures, the estimated faradaic current efficiency was 96.4% and the specific energy consumption at 500 A/m2 was 3.485 kWh per kg of iron. Chlorine gas was recovered by means already described in Example 2a.

Vanadium was also recovered by standard methods from the iron-depleted solution exiting the central compartment as follows. A stoechiometric amount of sodium chlorate ($NaClO_3$) was added to the iron-depleted solution to oxidize all the vanadium cations ($V^{4+}$, $V^{5+}$) into pentavalent vanadium ($V^{5+}$) according to the reaction:

$$5VO^{2+} + ClO_3^- + 2H_2O \rightarrow 5VO_2^+ + 0.5Cl_2(g) + 4H^+$$

Then the pH of the solution was raised by careful addition of a slurry of slacked magnesia ($Mg(OH)_2$) until the pH reached 2.0, but not above to avoid the precipitation of black mixed ferroso-ferric hydroxides. At that pH, the complete precipitation of hydrated vanadium pentoxide ($V_2O_5 \cdot 250H_2O$) occurred in the form of a gelatinous red brown precipitate. Since vanadium was the only species to precipitate in this case, the precipitation would stop at a vanadium concentration below about 0.02 mol/L in the solution. Reconcentration of the solution allowed to recover more vanadium.

The red brown precipitate was separated by filtration using a similar set-up to that described in Example 4. The red-brown gelatinous filter cake was removed from the filter paper and dried into an oven and later calcined inside a porcelain boat in dry air at 400° C. in a box furnace (Fisher Isotemp) the water vapour ($H_2O$), thereby yielding a red-orange powder of vanadium pentoxide. The powder was then transferred into an Inconel crucible, melted at 700° C. in air and cast onto a cool steel plate. The solidified black mass with a submetallic luster was then ground into a two disks vibratory cup mill with a hardmetal liner (Fritsch GmbH) using acetone as grinding aid and coolant. The product thus obtained was technical grade vanadium pentoxide powder containing some chromium, iron and manganese as major impurities.

Some results and characteristics of the electrolysis experiments conducted in Examples 2a, 2b, 5 and 6 are summarized in Table 5 below.

TABLE 5

| Experiment | pH of the catholyte at 25° C. | Temperature of catholyte (° C.) | Electrolyser design | Cathodic current density (A/m²) | Cell voltage ($U_{cell}$/V) | Faradaic current efficiency | Characteristic of iron metal deposit | Iron specific energy consumption (kWh/kg) | Chlorine specific energy consumption (kWh/m³) |
|---|---|---|---|---|---|---|---|---|---|
| Example 2a: Iron-rich metal chloride solution obtained after evaporation (example 1) and pH adjusted | 1.07 | 80 | Two compartments with anion exchange membrane (FIG. 3) | 500 | 2.528 | 80.0 (Fe + V oxyde) (Fe only 54%) 78.0 ($Cl_2$) | Blackened 68 wt. % Fe and 32 wt. % $V_2O_5$ | 3.033 (**) | 7.652 |
| Example 2b: (same as above) | 0.30 | 80 | Two compartments with anion exchange membrane (FIG. 3) | 1000 | 2.865 | 60.0 (Fe) 58.0 ($Cl_2$) | Smooth and bright 99.88 wt. % Fe 0.12 wt. % $V_2O_5$ | 4.584 | 11.663 |

TABLE 5-continued

| Experiment | pH of the catholyte at 25° C. | Temperature of catholyte (° C.) | Electrolyser design | Cathodic current density (A/m$^2$) | Cell voltage (U$_{cell}$/V) | Faradaic current efficiency | Characteristic of iron metal deposit | Iron specific energy consumption (kWh/kg) | Chlorine specific energy consumption (kWh/m$^3$) |
|---|---|---|---|---|---|---|---|---|---|
| Example 6: (same as above) | 1.10 | 80 | Three compartments with anion and cation exchange membranes (FIG. 4) | 500 | 3.50 | 96.4 (Fe) 95.0 (Cl$_2$) | 99.99 wt. % Fe smooth and soft | 3485 | 8.698 |
| Example 5: Iron-rich vanadium free solution from example 4 | 0.90 | 85 | Two compartments with anion exchange membrane (FIG. 3) | 200 | 1.85 | 97.9 (Fe) 95.0 (Cl$_2$) | 99.99 wt. % Fe smooth, soft | 1.814 | 4.600 |

Example 7

Electrolysis of an Iron-Rich Metal Chloride Solution that is Concentrated by its Recirculation In this example, the theoretical composition of an iron-rich metal chloride solution passing in a two-compartment electrolyser, in a recirculation situation, was determined by a mass balance calculation on the basis of a feedstock having a composition meeting the ranges of Table 1. More specifically, the chlorinator dust used in this example comprised 92.0 wt % FeCl$_2$, 4.8 wt % AlCl$_3$, 2.0 wt % MgCl$_2$, and 1.2 wt % MnCl$_2$. With this feedstock, for an aimed single-pass conversion of about 30%, an aimed overall iron conversion of about 90% and a FeCl$_2$ concentration entering the electrolyser of about 20% in a process as represented in FIG. 4, the mass balance calculations indicated a recirculation rate of 96.7% (expressed as a mass ratio between the flow rate of recirculation, i.e. the flow rate of the iron-depleted solution to be recirculated into an upstream reservoir, and the sum of (1) the flow rate of recirculation and (2) the flow rate of the bleed) and the following composition for the iron-rich metal chloride solution:

10-20% wt. FeCl$_2$ 10-12% wt. AlCl$_3$ 4.5-5% wt. MgCl$_2$ 2.5-3% wt. MnCl$_2$

Three synthetic solutions, comprising 10, 15 and 20% wt. FeCl$_2$, respectively, and meeting the above composition ranges for the other chlorides, were produced by dissolution of metal chlorides into demineralized water. In each case, the pH of the demineralized water was initially 4.7 and dropped to a value ranging between about −0.6 and −0.3 after metal chloride dissolution.

Each of the above-defined compositions were electrolysed galvanostatically at 500 and 1500 A/m$^2$. The electrolyser used was identical to that described in example 2a. The operating temperature was 80° C. and the volume flow rate of both the catholyte (iron-rich metal chloride solution) and the anolyte was 1.5 L/min. The measured cell voltage was 2.6 and 3.9 V for, respectively, 500 and 1500 A/m$^2$. The power was shut off after two hours of continuous electrolysis for the 500 A/m$^2$ test and after one hour of continuous electrolysis for the 1500 A/m$^2$ test, for each solution tested. The electrolyser was then opened and the electrodeposited iron was stripped from the cathode before being weighed. The resulting faradaic current efficiency as a function of ferrous iron concentration is shown in FIG. 12. The specific energy consumption at 500 A/m$^2$ and 1500 A/m$^2$ was, respectively, 2.65-2.83 kWh per kg of iron and 4.13-4.29 kWh per kg of iron.

The iron faradaic current efficiencies obtained in this Example are comparable to those obtained in previous examples that were using iron-rich metal chloride solutions as per the compositions given in Table 4.

In this example, no crystallisation of chlorides was noted upon preparation of either solution tested, suggesting that even the rather high rate of recirculation obtained in the mass balance calculations would be industrially acceptable for the tested feedstock.

In addition, the good results obtained with regard to faradaic current efficiency at both current densities used suggest that the pH of the solutions tested in this Example would also advantageously be applied to an industrial process for the tested feedstock.

Example 8

Removal of Calcium from Iron-Depleted Electrolyte

After each one of Examples 2a, 2b, 5 and 6, concentrated sulfuric acid was added to the iron- and possibly vanadium-depleted solution exiting the electrolyser for removing calcium as insoluble calcium sulfate dihydrate (CaSO$_4$.2H$_2$O) that precipitated. The precipitate was removed by filtration. The clear solution that contained only magnesium and/or aluminium chlorides was ready for pyrohydrolysis.

Example 9

Selection of the Cathode Material for Conducting Electrolysis in Examples 2a, 2b, 5, 6 and 7

Figure 13:
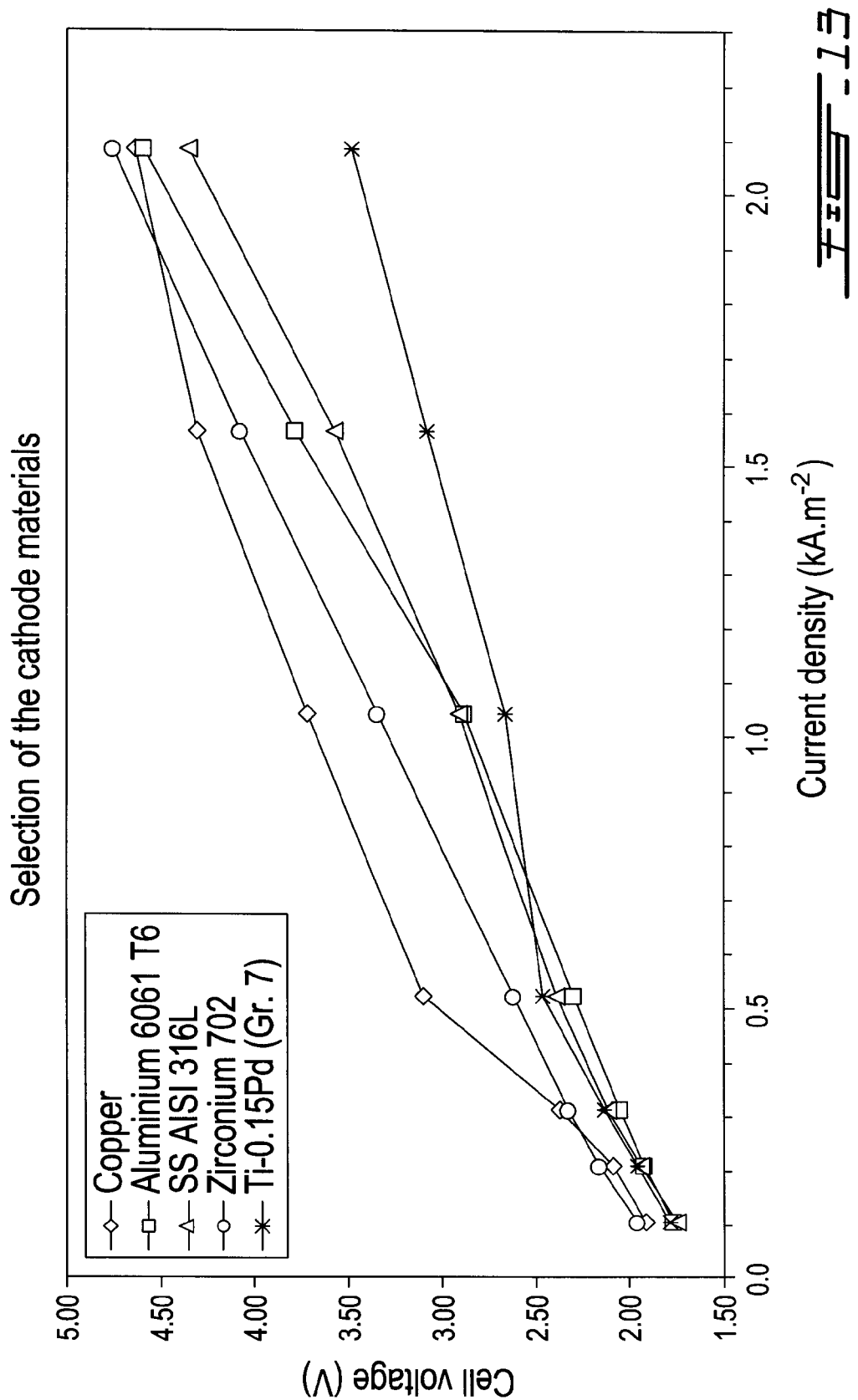
FIG. 13 is a graphical illustration showing the polarization curves as obtained in Example 8 (selection of a cathode material)

The selection of cathode material was conducted with an electrolyser and set-up identical to that used in Example 2a but with a synthetic catholyte circulating in loop and made of an aqueous solution of 350 g/L iron (II) chloride and 300 g/L magnesium (II) chloride adjusted at a pH of 1.1 while the anolyte that circulated in loop consisted of an aqueous solution of 20 wt. % hydrochloric acid with 17 wt. % magnesium chloride (MgCl$_2$) and 10,000 ppm of ferric iron (Fe$^{3+}$) as corrosion inhibitor the balance being deionised water. The electrolysis was performed galvanostatically at 80° C. during two hours. The polarization curves, that is, the cell voltage vs. the current density were recorded for each cathode material. The materials tested were a titanium-palladium alloy ASTM grade 7 (Ti-0.15Pd) from Titanium Industries, Zircadyne® 702 from Wah Chang, austenitic stainless steel AISI grade 316 L, aluminum grade 6061 T6 and pure copper. As expected, only titanium and zirconium allowed the easy stripping of the iron deposit. The polarization curves are presented in FIG. 13.

Example 10

Selection of the Anion Exchange Membrane for Conducting Electrolysis in Examples 2a, 2b, 5, 6 and 7

The selection of the anion exchange membrane was conducted with an electrolyser and set-up identical to that used in Example 2a. The synthetic catholyte circulating in loop in the cathodic compartment was made of an aqueous solution of 350 g/L iron (II) chloride and 300 g/L magnesium (II) chloride adjusted at a pH of 1.1 while the anolyte that circulated in loop in the anodic compartment consisted of an aqueous solution of 20 wt. % hydrochloric acid with 17 wt. % magnesium chloride ($MgCl_2$) and 10,000 ppm of ferric iron ($Fe^{3+}$) as corrosion inhibitor, the balance being deionised water. The electrolysis was performed galvanostatically at 80° C. during two hours. The polarization curves, that is, the cell voltage vs. the current density were recorded for each anion exchange membrane. The membranes tested were a Excellion® I-100 (SnowPure LLC), Neosepta® AMH, ACM, and AHA (Tokuyama Co. Ltd.—Eurodia), Selemion (Asahi Glass) and Ultrex® AMI-7001 (Membrane International). The polarization curves are presented in FIG. 14.

Example 11

Selection of the Composition of Anolyte for Conducting Electrolysis in Examples 2a, 2b, 5, 6 and 7

Figure 15:
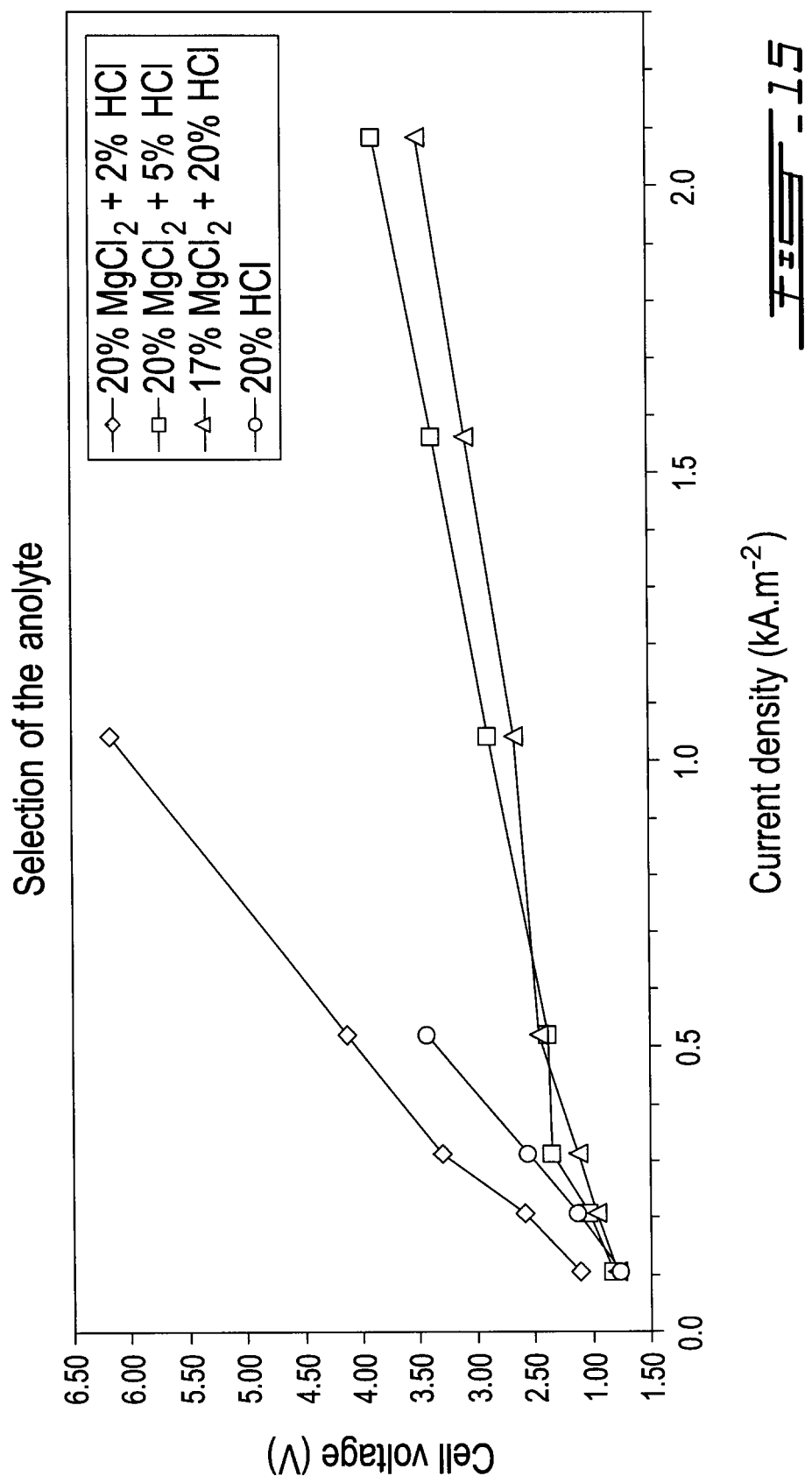
FIG. 15 is a graphical illustration showing the polarization curves as obtained in Example 10 (selection of an anolyte).

The selection of the anolyte was conducted with an electrolyser and set-up identical to that used in Example 10 but with a synthetic catholyte circulating in loop in the cathodic compartment, which was made of an aqueous solution of 350 g/L iron (II) chloride and 300 g/L magnesium (II) chloride adjusted at a pH of 1.1 and an anolyte circulating in loop in the anodic compartment, the composition of which varied as follows: (i) 20 wt. % $MgCl_2$+2 wt. % HCl; (ii) 20 wt. % $MgCl_2$+5 wt. % HCl; (iii) 17 wt. % $MgCl_2$+20 wt. % HCl; (iv) 20 wt. % HCl, all with 10,000 ppm wt. Fe(III) as a corrosion inhibitor. The electrolysis was performed galvanostatically at 80° C. during two hours. The polarization curves, that is, the cell voltage vs. the current density were recorded for each anolyte composition. The polarization curves are presented in FIG. 15.

Although the present invention has been described hereinabove by way of specific embodiments thereof, it can be modified, without departing from the spirit and nature of the subject invention as defined in the appended claims.

REFERENCES

[1] Harris, et al.—Process for chlorination of titanium bearing materials and for dechlorination of iron chloride.—in Weiss, A. (ed)(1976)—*World Mining and Metals Technology*.—The Society of Mining Engineers, New York, Chap. 44, pages 693-712.

[2] Gray, D. A. and Robinson, M.—Process for the Recovery of Chlorine.—G.B. Pat. 1,407,034; Sep. 24, 1975.

[3] Dunn, W. E. (Rutile & Zircon Mines Ltd.)—Process for Beneficiating and Titanoferrous Ore and Production of Chlorine and Iron Oxide.—U.S. Pat. No. 3,865,920; Feb. 11, 1975.

[4] Walsh, R. H. (Columbia Southern Chemical Corp.)—Metal Chloride Manufacture.—U.S. Pat. No. 2,954,274; Sep. 27, 1960.

[5] Reeves, J. W. et al. (E.I. Du Pont de Nemours)—Multistage iron chloride oxidation process.—U.S. Pat. No. 3,793,444; Feb. 19, 1974.

[6] Haack, D. J.; and Reeves, J. W. (E.I. Du Pont de Nemours Company)—Production of chlorine and iron oxide from ferric chloride.—U.S. Pat. No. 4,144,316; Mar. 13, 1979.

[7] Reeves, J. W; Sylvester, R. W; and Wells, D. F. (E.I. Du Pont de Nemours Company)—*Chlorine and iron oxide from ferric chloride—apparatus*.—U.S. Pat. No. 4,282,185; Aug. 4, 1981.

[8] Hsu, C. K (SCM Chemicals)—Oxidation of ferrous chloride directly to chlorine in a fluid bed reactor.—U.S. Pat. No. 4,994,255; Feb. 19, 1991.

[9] Hartmann; A.; Kulling; A.; and Thumm; H. (Kronos Titan GmbH)—Treatment of iron(ii)chloride.—U.S. Pat. No. 4,060,584; Nov. 29, 1977.

[10] Hooper, B. N.; Hirsch, M.; Orth, A.; Bennett, B.; Davidson, J. F.; Conduit, M.; Fallon, N.; and Davidson, P. J. (Tioxide Group Ltd.)—Treatment of iron chloride from chlorination dust.—U.S. Pat. No. 6,511,646; Jan. 1, 2003.

[11] Levy, I. S.—Electrolysis of ferrous chloride.—U.S. Pat. No. 1,752,348; Apr. 1, 1930.

[12] Ogasawara, T.; Fujita, K.; and Natsume, Y. (Osaka Titanium)—Production of iron and chlorine from aqueous solution containing iron chloride.—Japanese Patent 02-015187; Jan. 18, 1990.

[13] Cardarelli, F. *Materials Handbook: a Concise Desktop Reference*. Springer-Verlag London Limited [Ed.]. 2000. p. 323.

[14] Greaney, M. A.—*Method for Demetallating Petroleum Streams (LAW 639)*—U.S. Pat. No. 5,911,869; Jun. 15, 1999.

What is claimed is:

1. An electrochemical process for the recovery of metallic iron and chlorine gas from an iron-rich metal chloride solution, which process comprises:
   a) providing an iron-rich metal chloride solution;
   b) electrolysing said iron-rich metal chloride solution in an electrolyser comprising a cathodic compartment equipped with a cathode having a hydrogen overpotential higher than that of iron and containing a catholyte having a pH below about 2, an anodic compartment equipped with an anode and containing an anolyte, and a separator allowing for anion passage, said electrolysing step comprising circulating said iron-rich metal chloride solution in a non-anodic compartment of said electrolyser, thereby causing iron to be electrodeposited at the cathode and chlorine gas to evolve at the anode, and leaving an iron-depleted solution;
   c) separately recovering said electrodeposited iron and said chlorine gas; and
   d) recirculating at least part of said iron-depleted solution into said iron-rich metal chloride solution in a).

2. The electrochemical process of claim 1, wherein the catholyte contains mostly $AlCl_3$ as a non-iron metal chloride and wherein the pH of the catholyte is periodically adjusted to a predetermined pH that ranges between about −1 and about 2.

3. The electrochemical process of claim 1, wherein the catholyte contains mostly $MgCl_2$ as a non-iron metal chloride and wherein the pH of the catholyte is periodically adjusted to a predetermined pH that ranges between about 0.3 and about 1.8.

4. The electrochemical process of claim 3, wherein the pH of the catholyte is adjusted upstream of said electrolysing b).

5. The electrochemical process of claim 1, wherein recirculating d) is made at a recirculation rate over about 60%.

6. The electrochemical process of claim 1, wherein the cathode has an overvoltage, at 200 A·m$^{-2}$, greater than about 425 mV in 0.5 mol·dm$^{-3}$ HCl at 25° C.

7. The electrochemical process of claim 6, wherein the cathode is constructed from or coated with a material being one of titanium, titanium alloy, zirconium, zirconium alloy, zinc, zinc alloy, cadmium, cadmium alloy, tin, tin alloy, copper, copper alloy, lead, lead alloy, niobium, niobium alloy, gold, gold alloy, mercury or metallic amalgam with mercury.

8. The electrochemical process of claim 7, wherein the material consists of titanium or titanium alloy.

9. The electrochemical process of claim 1, wherein the cathode is pretreated before the electrolysing step.

10. The electrochemical process of claim 1, wherein said anolyte is circulated in loop within the anodic compartment of the electrolyser.

11. The electrochemical process of claim 1, wherein said anolyte comprises HCl, a salt being at least one of $MgCl_2$, NaCl, LiCl, KCl or $CaCl_2$, and Fe(III) as a corrosion inhibitor.

12. The electrochemical process of claim 1, wherein the anode is a dimensionally stable anode of the type [M/M$_x$O$_y$-A$_z$O$_t$], wherein M is a refractory metal or an alloy with a valve action property, including titanium, titanium alloy, zirconium, zirconium alloy, hafnium, hafnium alloy, vanadium, vanadium alloy, niobium, niobium alloy, tantalum or tantalum alloy, wherein M$_x$O$_y$ is a metallic oxide of a valve metal forming a thin and impervious layer protecting the base metal, including $TiO_2$, $ZrO_2$, $HfO_2$, $NbO_2$, $Nb_2O_5$, $TaO_2$, or $Ta_2Os$, and wherein A$_z$O$_t$ is an electrocatalytic metal oxide of a noble metal, an oxide of the platinum group metals including $RuO_2$, $IrO_2$ or $P_tO_x$, or a metallic oxide, including $SnO_2$, $Sb_2O_5$ or $Bi_2O_3$.

13. The electrochemical process of claim 1, wherein the anode is constructed from bulk electronically conductive ceramics, including sub-stoichiometric titanium oxides having as a general formula $TiO_{2n-1}$, wherein n is an integer equal to or above 3; conductive oxides with a spinel structure $AB_2O_4$, wherein A is Fe(II), Mn(II) or Ni(II), and B is Al, Fe(III), Cr(III) or Co(III); or conductive oxides with a perovskite structure $ABO_3$, wherein A is Fe(II), Mn(II), Co(II) or Ni(II), and B is Ti(IV), or with a pyrochlore structure $AB_2O_7$.

14. The electrochemical process of claim 1, wherein the anode is constructed from carbon-based materials.

15. The electrochemical process of claim 1, wherein the electrolysing step is performed in a two-compartment electrolyser in which the separator is an ion-exchange membrane, and wherein said iron-rich metal chloride solution is circulated in loop within the cathodic compartment of the electrolyser, acting as the catholyte.

16. The electrochemical process of claim 1, wherein the electrolysing step is performed in a three-compartment electrolyser in which the anodic and cathodic compartments are separated from a central compartment by an anion and a cation exchange membranes, respectively, and wherein the iron-rich metal chloride solution is circulated within the central compartment of the electrolyser.

17. The electrochemical process of claim 16, wherein said catholyte is circulated in loop within the cathodic compartment.

18. The electrochemical process of claim 16, wherein the catholyte comprises about 1 to about 450 g/L of iron (II) chloride, about 1 to about 350 g/L $MgCl_2$ or $CaCl_2$ or a mixture thereof, optionally about 1 to about 350 g/L $AlCl_3$, and 0 to about 10 g/L of free HCl.

19. The electrochemical process of claim 1, wherein the electrolysing step is performed under constant current at a current density ranging from about 50 to about 5000 A/m$^2$.

20. The electrochemical process of claim 19, wherein the electrolysing step is performed under constant current at a current density ranging from about 50 to about 1000 A/m$^2$, thereby obtaining an essentially dendrite-free smooth deposit of iron.

21. The electrochemical process of claim 19, wherein the electrolysing step is performed under constant current at a current density ranging from about 3000 to about 5000 A/m$^2$, thereby obtaining an essentially powdered iron.

22. The electrochemical process of claim 1, wherein the electrolysing step is performed at an operating temperature ranging from about 40 to about 110° C.

23. The electrochemical process of claim 1, wherein the iron-rich metal chloride solution originates from carbo-chlorination wastes, spent acid leaching liquors or pickling liquors.

24. The electrochemical process of claim 23, wherein said providing of an iron-rich metal chloride solution a) includes:
  a1) leaching a solid carbo-chlorination waste with a hot aqueous solution, thereby forming an aqueous slurry; and
  a2) subjecting said aqueous slurry to a separation of solids, thereby forming an insoluble cake and isolating an iron-rich metal chloride solution.

25. The process of claim 24, wherein said hot aqueous solution is hot process water, hot diluted hydrochloric acid, hot spent leaching acid or a spent pickling liquor.

26. The process of claim 24, wherein the solid separation step is performed by physical separation method.

27. The electrochemical process of claim 1, wherein the iron-rich metal chloride solution comprises vanadium, said process further comprising a vanadium separation step upstream, during or downstream of said electrolysing b).

28. The electrochemical process of claim 27, wherein said vanadium separation step occurs upstream of said electrolysing b).

29. The electrochemical process of claim 28, wherein said vanadium separation step consists in removing vanadium from the iron-rich metal chloride solution concurrently with chromium by co-precipitation at a pH ranging from about 0.5 to about 3.0.

30. The electrochemical process of claim 27, wherein the pH of the catholyte ranges between about 0.3 and about 0.5, causing vanadium to precipitate at the cathode along with iron electrodeposition, and wherein the vanadium-separation step occurs downstream of said electrolysing b).

31. The electrochemical process of claim 27, wherein the pH of the catholyte ranges between about 0.6 and about 1.8, causing vanadium to essentially remain within the circulating iron-rich metal chloride solution while iron is electrodeposited at the cathode, and wherein vanadium is thereafter recovered from the iron-depleted solution exiting the electrolyser, whereby the vanadium separation step occurs during said electrolysing b).

32. An electrochemical process of claim 1 wherein said recovering of iron in c) is conducted by physically stripping said iron electrodeposited at the cathode and said recovering of chlorine is conducted by suctioning of chlorine gas above the anodic compartment.

33. The electrochemical process of claim 1, wherein chlorine gas recovered from the anode is further dried and liquefied.

34. The electrochemical process of claim 1, wherein the iron-depleted solution exiting the electrolyser is recovered and further treated in order to remove calcium and radioactivity by addition of sulphuric acid, thereby producing a magnesium- and aluminum-rich brine.

35. The process of claim 34, further comprising a step of pyrohydrolysis of said magnesium- and aluminum-rich brine in a fluid-bed pyrohydrolyser, thereby producing azeotropic hydrochloric acid and spinel beads.

36. The process of claim 35, further comprising recovery of said azeotropic hydrochloric acid for export.

37. The process of claim 1, wherein a bleed solution formed during the process is electrolysed through a single-pass electrolyser, thereby recovering more iron and chlorine values.

38. An electrochemical process for the recovery of metallic iron and chlorine gas from an iron-rich metal chloride solution, which process comprises:
   a) providing an iron-rich metal chloride solution;
   b) electrolysing said iron-rich metal chloride solution in a two-compartment electrolyser comprising a cathodic compartment equipped with a cathode having a hydrogen overpotential higher than that of iron, and an anodic compartment equipped with an anode and containing an anolyte, said cathodic and anodic compartments being separated by an anion-exchange membrane, said electrolysing step comprising circulating said iron-rich metal chloride solution, adjusted to a pH below about 2, as a catholyte in said cathodic compartment of said electrolyser, thereby causing iron to be electrodeposited at the cathode and chlorine gas to evolve at the anode, and leaving an iron-depleted solution;
   c) separately recovering said electrodeposited iron and said chlorine gas; and
   d) recirculating at least part of said iron-depleted solution into said iron-rich metal chloride solution in a).

\* \* \* \* \*